United States Patent
Akamatsu et al.

(10) Patent No.: US 6,707,954 B1
(45) Date of Patent: Mar. 16, 2004

(54) IMAGE PROCESSING APPARATUS, IMAGE PROCESSING METHOD, AND IMAGE FORMING APPARATUS

(75) Inventors: Manabu Akamatsu, Ebina (JP); Yoshinori Awata, Ebina (JP); Kenichi Takahashi, Ebina (JP); Kazumi Fukazawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/414,956

(22) Filed: Oct. 12, 1999

(30) Foreign Application Priority Data

Nov. 9, 1998 (JP) .......................................... 10-317181

(51) Int. Cl.7 ................................................ G06K 9/32
(52) U.S. Cl. ...................................... 382/298; 382/286
(58) Field of Search ................................ 382/298, 293, 382/286, 282, 299; 345/660, 666; 358/528, 449, 451, 1.2

(56) References Cited

U.S. PATENT DOCUMENTS 5,796,877 A * 8/1998 Gusmano .................... 382/298
6,195,462 B1 * 2/2001 Bryniarski et al. ......... 382/239
6,310,698 B1 * 10/2001 Samworth .................... 358/1.9
6,327,388 B1 * 12/2001 Zhou ........................... 382/204

FOREIGN PATENT DOCUMENTS

| JP | 9-81729 | 3/1997 |
|----|---------|--------|
| JP | 10-126614 | 5/1998 |

* cited by examiner

Primary Examiner—Yon J. Couso
(74) Attorney, Agent, or Firm—Morgan Lewis & Bockius LLP

(57) ABSTRACT

There are provided an image processing apparatus and an image processing method which are capable of correctly determining the scaling factor of an input image containing a specific image composed of a predetermined number of partial images. When an input image is inputted, the partial image detection unit 1 detects information about partial images. As information about partial images, information indicating whether partial images exist, the size of the partial images, and the like are outputted. The information about partial images is outputted for each pixel of an input image and a pattern composed of the information about partial images is obtained. The scaling factor estimation unit 2 uses a pattern composed of the information about partial images outputted from the partial image detection unit 1 to detect an area where a predetermined number of partial images exist, and determines the scaling factor of the input image from information of the area.

19 Claims, 20 Drawing Sheets

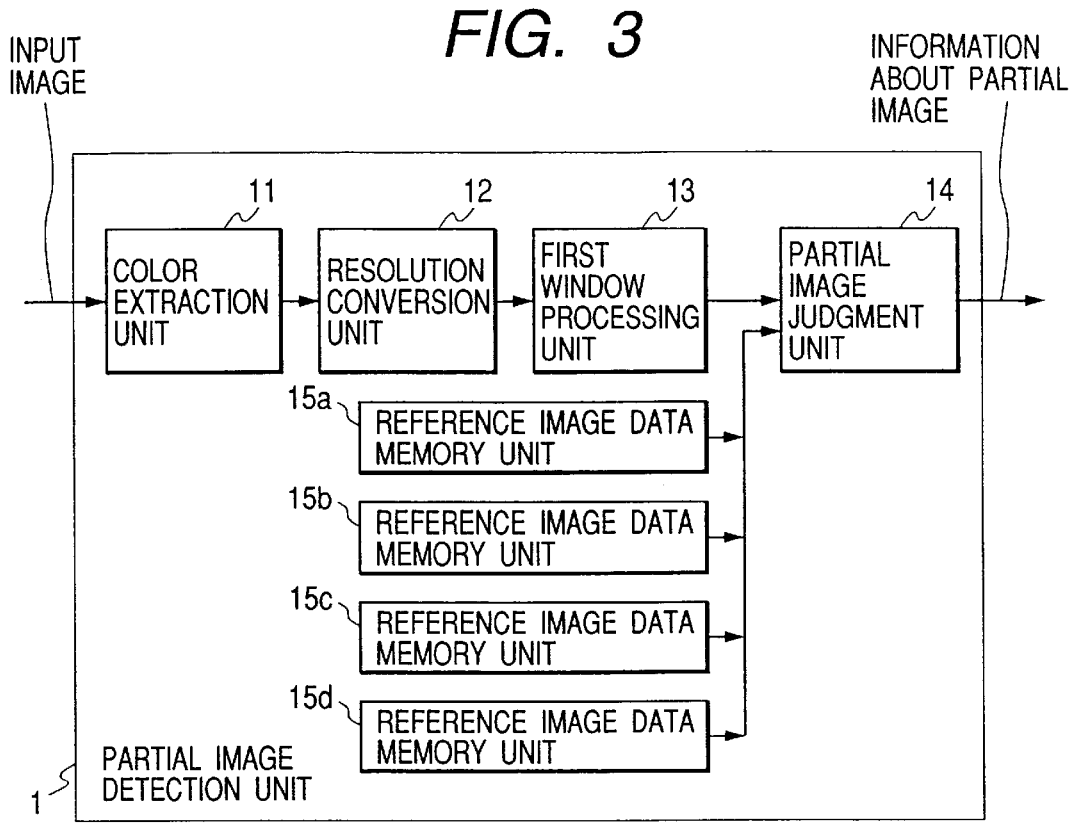

CENTRAL PIXEL (X5, Y5)

7 DOTS

8 DOTS

9 DOTS

10 DOTS

FIG. 21

| SCALING FACTOR (%) | NUMBER OF PIECES OF INFORMATION ABOUT PARTIAL IMAGE ||||||||| 
| | JUDGMENT AREA 1 | JUDGMENT AREA 2 | JUDGMENT AREA 3 | JUDGMENT AREA 4 | JUDGMENT AREA 5 | JUDGMENT AREA 6 | JUDGMENT AREA 7 | JUDGMENT AREA 8 | JUDGMENT AREA 9 |
|---|---|---|---|---|---|---|---|---|---|
| 120 | 1 | 1 | 0 | 0 | 0 | 0 | 0 | 0 | 2 |
| 115 | 1 | 1 | 0 | 0 | 0 | 0 | 0 | 2 | — |
| 110 | 2 | 0 | 0 | 0 | 0 | 0 | 2 | — | — |
| 105 | 2 | 0 | 0 | 0 | 0 | 2 | — | — | — |
| 100 | 2 | 0 | 0 | 0 | 2 | — | — | — | — |
| 95 | 2 | 0 | 0 | 2 | — | — | — | — | — |
| 90 | 2 | 0 | 2 | — | — | — | — | — | — |
| 85 | 2 | 2 | — | — | — | — | — | — | — |
| 80 | 4 | — | — | — | — | — | — | — | — |

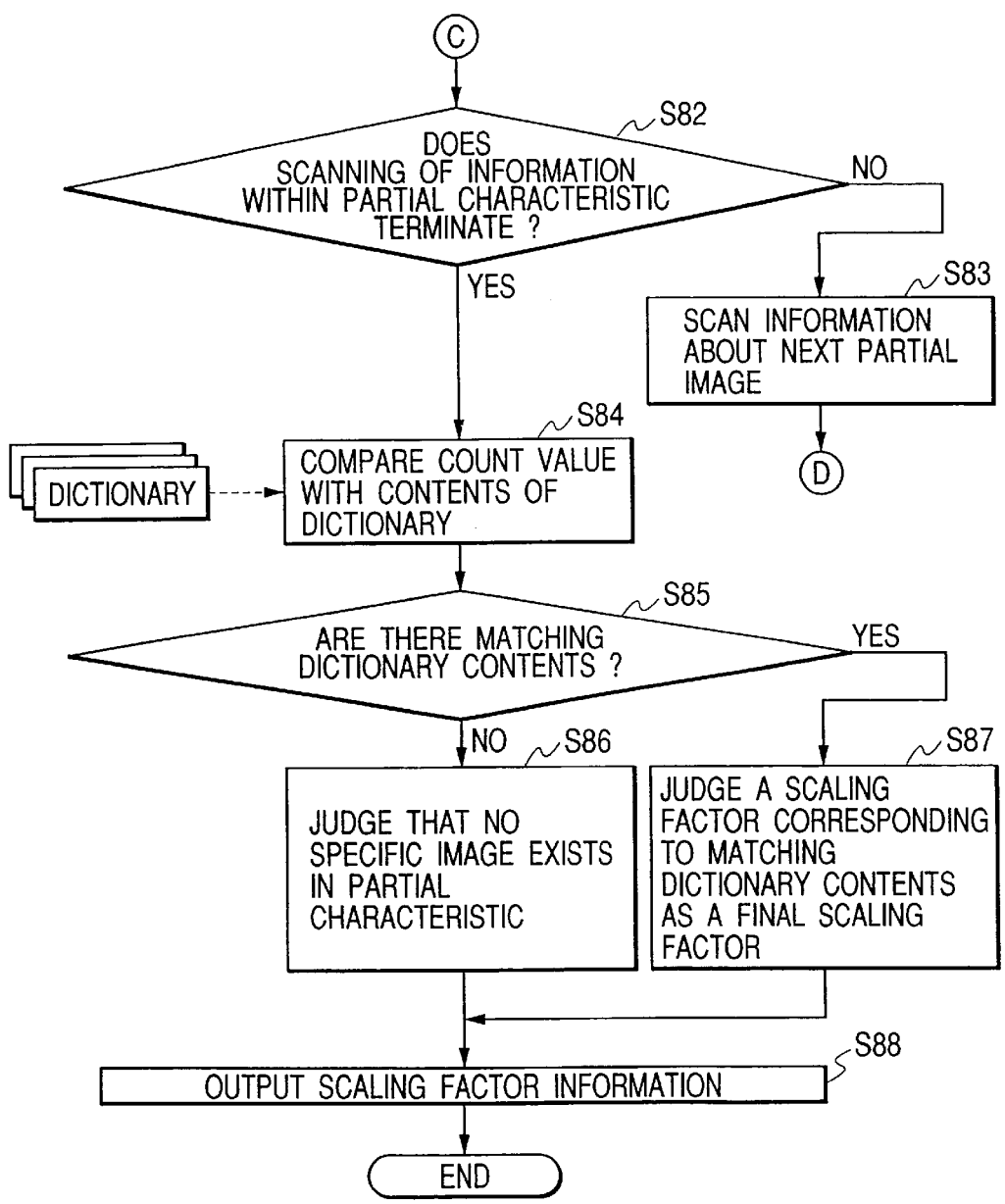

IMAGE PROCESSING APPARATUS, IMAGE PROCESSING METHOD, AND IMAGE FORMING APPARATUS

BACKGROUND OF THE INVENTION

1. Field of the Invention

The present invention relates to an image processing apparatus and an image processing method which determines a scaling factor from image data of original images scanned by an image input apparatus on a pixel basis or image data sent by a communication part, and detects a specific image in the image data. It also relates to an image forming apparatus which nullifies image data containing a specific image by using such an image processing apparatus and an image processing method.

2. Description of the Related Art

In recent years, a system as described below has been proposed for application to image forming apparatuses such as full color copiers. This system in advance embeds a specific pattern such as two-dimensional codes in publications, important papers, valuable papers, or the like and recognizes the pattern to prevent illicit use such as unauthorized duplication of publications.

In principle, a copier duplicates an original put in a predetermined place to exactly the same size as its original size or according to a specified scaling factor. Accordingly, an apparatus for recognizing a specific pattern in the copier can easily determine whether input image data is scaled, and its scaling factor if scaled, and can execute identification operations based on the scaling factor information.

On the other hand, unlike a copier, a printer is connected to an external apparatus such as a personal computer and image data to be outputted is sent from the external apparatus. A conceivable case is to read an original having a specific pattern embedded in advance into a memory within a personal computer by a reader such as a scanner and send the original to a printer as image data after scaling it by several percent. In such a case, an apparatus for recognizing a specific pattern within the printer judges that the specific pattern in the scaled image data is different from an intended specific pattern in size because the scaling factor is unknown. As a result, the specific pattern in the scaled image data may not be recognized as a specific pattern to be detected.

Techniques for preventing a specific pattern from being unrecognizable are disclosed in, e.g., Japanese Published Unexamined Patent Applications No. Hei 9-81729 and Hei 10-126614. The techniques allow an image recognition apparatus for recognizing a given specific pattern to calculate a scaling factor. The technique described in Japanese Published Unexamined Patent Application No. Hei 9-81729 uses a plurality of reference images, such as an image having an average or typical characteristic of a specific pattern to be recognized, an image having a maximum characteristic, and an image having a minimum characteristic. Matching is performed between the plurality of reference images and an object to be recognized, and a peak matching position and a matching level are obtained. Interpolation processing is performed using the results to calculate a scaling factor.

However, with this technique, other than circular images cannot be used as object images to be recognized. That is, in the case of non-circular object images or object images composed of a plurality of partial images which are not circular as a whole, images rotated intentionally or by skew may have been inputted. To provide for such a case, matching processing must be performed for rotated images. However, the matching processing for rotated images would require large-scale circuits if embodied by hardware, and huge amounts of computation processing if embodied by software. To correctly calculate a scaling factor from circular images only, large circular images have to have been formed in an image, posing a problem that image design is impaired.

The technique described in Japanese Published Unexamined Patent Application No. Hei 10-126614 detects a given mark from input image data and estimates the scaling factor of the input image data from the size of the mark. This literature detects a mark as large as 16 mm in diameter and estimates a scaling factor from the size of the mark. However, use of such a large mark would impair image design as described above. If a mark as small as about 1 mm is used and an input image is subjected to image resolution conversion (from 600 dpi to 100 dpi) according to the literature, the diameter of a mark of scaling factor 100% will change from 24 dots (600 dpi) to 4 dots (100 dpi). Such a small diameter is useless to correctly estimate a scaling factor. For example, scaling factors from 90 to 110% produce the same diameter of 4 dots, so that a scaling factor cannot be determined. If an original image contained a dummy mark that is the same as a mark in shape but is different from it in size, it would become more difficult to determine a scaling factor.

SUMMARY OF THE INVENTION

The present invention has been made in consideration of the above-described situation and its object is to provide an image processing apparatus and an image processing method which are capable of correctly determining the scaling factor of an input image containing a specific image composed of a predetermined number of partial images, an image processing apparatus and an image processing method which are capable of identifying the specific image based on the scaling factor, and an image forming apparatus which nullifies the image containing the specific image.

The present invention extracts, from an input image containing a specific image composed of a predetermined number of partial images that may have been scaled, the characteristic of the partial images, and determines the scaling factor of the input image from information of an area in which a predetermined number of images exist, the images being extracted as partial images based on the characteristic of the partial images. Since a scaling factor is thus determined from an area where a plurality of partial images making up a specific image exist, the partial images can be extracted from the input image regardless of a scaling factor and a scaling factor can be correctly determined from information of an area where the extracted partial images exist. A large specific image can be formed by, e.g., small partial images so that a scaling factor can be correctly determined without impairing image design. The partial images can have an identical shape and an identical size.

Furthermore, with consideration of the thus determined scaling factor of the input image, by comparing the distribution of the partial images with the specific image, it is judged whether the specific image is contained in the input image or not. By this process, after correctly determining the scaling factor of the scaled input image, it can be determined whether the specific image exists in the input image or not.

By providing such an image processing apparatus or an image processing method in an image forming apparatus as a recognition part, a specific image, if it exists in inputted image data, can be nullified. In this case, even if the inputted image data is for a scaled image, a scaling factor can be correctly determined as described above and the existence of a specific image can be judged, so that image data containing the specific image can be correctly nullified.

BRIEF DESCRIPTION OF THE DRAWINGS

FIG. 3 is a block diagram showing a partial image detection unit in the first embodiment of an image processing apparatus of the present invention.

FIG. 4 is a diagram for explaining a relationship between the sizes of a partial image after resolution conversion and scaling factors.

FIG. 21 is a diagram for explaining an example of the contents of a dictionary in the second embodiment of an image processing apparatus of the present invention.

DESCRIPTION OF THE PREFERRED EMBODIMENTS

Figure 1:
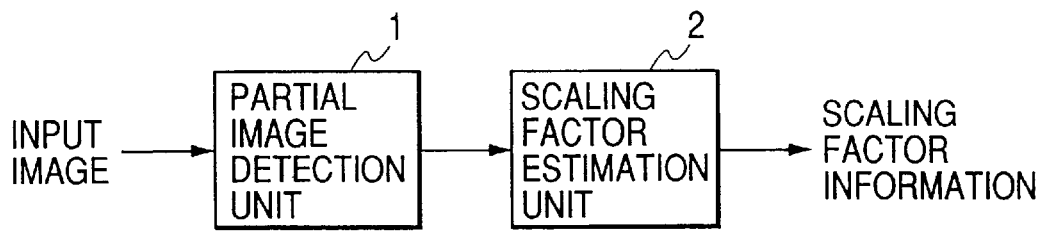
FIG. 1 is an overall block diagram showing a first embodiment of an image processing apparatus of the present invention.

FIG. 1 is an overall block diagram showing a first embodiment of an image processing apparatus of the present invention. In FIG. 1, the reference numeral 1 designates a partial image detection unit and 2 designates a scaling factor estimation unit. This embodiment assumes that an input image contains a specific image composed of a predetermined number of partial images. The input image, including the specific image, may have been scaled.

The partial image detection unit 1 extracts the characteristic of partial images contained in the input image and outputs them as information about partial images. In this stage, extracted partial images need not be actually partial images; all image patterns considered partial images are extracted, and for each of the image patterns considered as the extracted partial images, the characteristic that the image pattern would have if it is a partial image is extracted. The characteristic of partial images may, in this embodiment, be information indicating the existence of the partial images or the information plus information about the size of the partial images. These pieces of information can be outputted as information about the partial images. Information about partial images can be outputted for each pixel of the input image and a pattern composed of information about the partial images can be obtained. The position where the partial images exist can be indicated by the pattern.

The scaling factor estimation unit 2 uses a pattern composed of information about partial images outputted from the partial image detection unit 1 to detect an area where a predetermined number of partial images exist, and determines the scaling factor of the input image from information of the area. At this time, although similar image patterns other than partial images are also extracted, the fact that a predetermined number of extracted patterns exist in a predetermined area helps to prevent wrong identification of similar image patterns. If a scaling factor is larger, a predetermined number of partial images exist in a larger area, and if a scaling factor is smaller, a predetermined number of partial images exist in a smaller area. This fact can be used to determine a scaling factor by detecting an area where a predetermined number of partial images exist. In this case, since a scaling factor is not determined by the size itself of each partial image, large partial images are not required. Conversely, even a collection of small partial images helps to determine a scaling factor with a large image as an overall specific image, so that the scaling factor of the input image can be correctly determined.

Figure 2A:
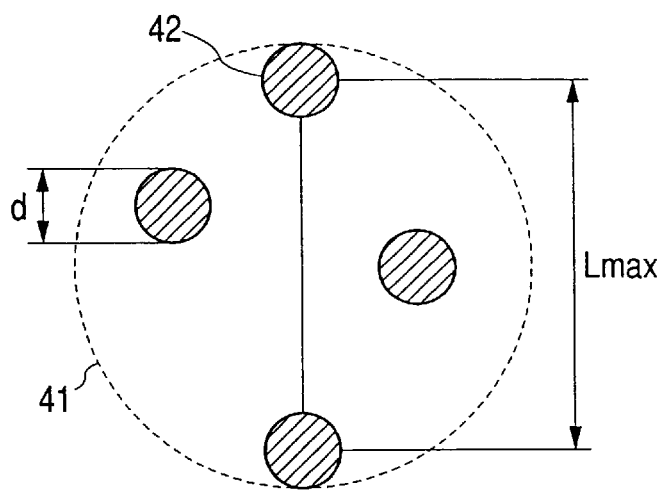
FIG. 2 is a diagram for explaining a specific image.

FIG. 2 is a diagram for explaining a specific image. In FIG. 2, 41 designates a specific image and 42 designates partial images. The specific image 41 can be represented as a pattern as shown in FIG. 2A. The specific image 41 in this example is composed of four partial images 42. All of the partial images 42, in this example, have an identical shape and an identical size and are represented as painted circular patterns. Specifically, they are circular patterns having a diameter (d) of 1 mm. The four partial images 42 are placed within the range of a maximum diameter Lmax of 5 mm, which is the distance between the centers of the partial images 42. Of course, the shape, size, and arrangement of the partial images 42, and the number of partial images within a specific image can be freely set in advance. It is assumed that the specific image 41 contains no image except for the plurality of partial images 42.

Figure 2B:
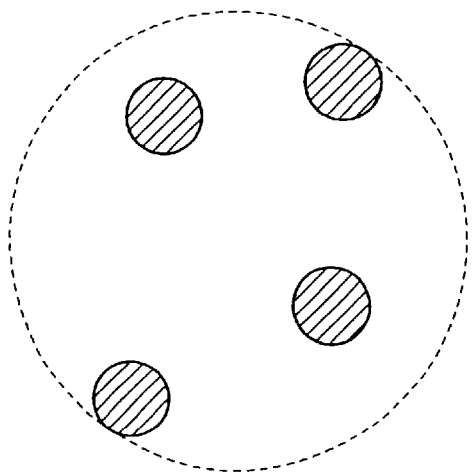

Such a specific image 41, when rotated as shown in FIG. 2B, is not made to conform to the pattern of FIG. 2A by the conventional recognition technique which employs simple pattern matching. Accordingly, patterns for rotation, and special hardware and software for rotation are required. In the present invention, as described later, certain areas, for example, an area corresponding to the specific image 41 and the scaled equivalent of the area are allocated, and based on the number of partial images existing within the areas, a scaling factor and the existence and absence of a specific image are determined. This makes it possible to easily and correctly determine a scaling factor and judge the existence and absence of a specific image.

FIG. 3 is a block diagram showing a partial image detection unit in the first embodiment of an image processing apparatus of the present invention. In FIG. 3, reference numeral 11 designates a color extraction unit; 12, a resolution conversion unit; 13, a first window processing unit; 14, a partial image judgment unit; and 15a to 15d, reference image data memory units. The color extraction unit 11 extracts only preset colors from an input image. The resolution conversion unit 12 reduces resolution for the input image from which a specific color is extracted in the color extraction unit 11. As a specific example, a resolution of 600 dpi of an input image can be converted into a resolution of about 200 dpi.

The size of image data to be processed can be reduced by the color extraction unit 11 and the resolution conversion unit 12, so that load in subsequent processing can be reduced. If not required, the image processing apparatus may be configured without providing the color extraction unit 11 or/and the resolution conversion unit 12.

FIG. 4 is a diagram for explaining a relationship between the sizes of a partial image after resolution conversion and scaling factors. As shown in FIG. 2, an input image containing a specific image composed of circular partial images having a diameter of about 1 mm is inputted at 600 dpi and subjected to resolution conversion into 200 dpi, with the result that the partial images turn into images of about 8 dots. When an image containing such a specific image is inputted in an enlarged or reduced form, the partial images are scaled as shown in FIG. 4 in accordance with a given scaling factor.

Referring back to FIG. 3, the first window processing unit 13 sequentially allocates, as allocation areas, areas of a given range from the image whose resolution is reduced in the resolution conversion unit 12. The allocation areas can be set to any shape. For example, a shape suited for the partial image 42 may be used. Or for simplicity of processing, an m-by n-pixel rectangular area is practicable. Area allocation is performed in a manner that, for each pixel of an image inputted to the first window processing unit 13, successively allocates allocation areas with the pixel as a central pixel.

Figure 5:
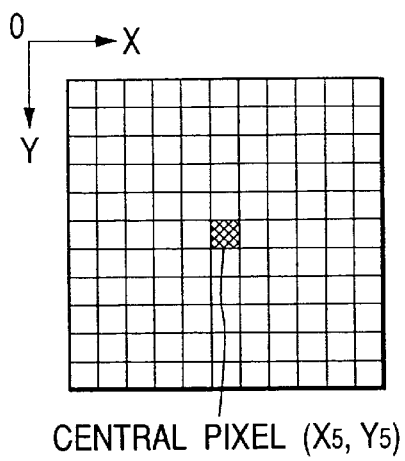
FIG. 5 is a diagram for explaining an allocation area.

FIG. 5 is a diagram for explaining an allocation area. In the case of the specific image shown in FIG. 2, as shown in FIG. 4, the diameters of the partial images 42 when scaling factors are 80 to 85%, 85 to 100%, 100 to 110%, and 110 to 120% are 7, 8, 9, an 10 dots, respectively. Accordingly, if the first window processing unit 13 allocates an allocation area the size of which allows a circle having a diameter of 10 dots to be represented, the partial images 42 can be allocated with respect to an image scaled to up to 120%. For this reason, an area of 11×11 dots, for example, can be allocated as an allocation area, as shown in FIG. 5. To indicate internal locations of the allocation area, with the upper left corner of the allocation area as an origin (X0, Y0), an X axis is taken in the horizontal direction and a Y axis is taken in the vertical direction. A pixel at the center (X5, Y5) is a central pixel.

Referring back to FIG. 3 again, the partial image judgement unit 14 compares images of allocation areas allocated in the first window processing unit 13 with reference image data stored in the reference image data memory units 15a to 15d. The comparison may be made in any way. For example, an image of an allocation area and reference image data are compared on a pixel basis, and if the number of matches is larger than a threshold value set in advance for each of the reference image data, it is judged that the image of the allocation area matches the reference image data; if smaller than the threshold value, it is judged that they do not match.

If an image of an allocation area matches one of a plurality of pieces of the reference image data, it is judged that a partial image exists in the allocation area and matches the reference image data. If an image of an allocation area matches a plurality of pieces of the reference image data, for example, it may be judged that the image matches reference image data having the largest number of matches with it.

Information indicating whether a partial image exists is outputted as the characteristic of the partial image for each allocation area. If it is judged that an image of an allocation area matches certain reference image data, information indicating the range of scaling factors corresponding to the matching reference image data can be outputted for each allocation area. These pieces of information are outputted as information about partial images. Herein, a code corresponding to matching reference image data is outputted as information indicating the range of scaling factors. For example, if it is judged that an image of an allocation area matches reference image data stored in the reference image data memory unit 15a, '001' is outputted; similarly, if it is judged that it matches reference image data stored in the reference image data memory units 15b to 15d, '010', '011', and '100' are outputted, respectively. If there is no match with any reference image data, '000' is outputted. By thus outputting information indicating the range of scaling factors, a rough scaling factor of a detected partial image is obtained, so that information indicating the existence of the partial image and its rough scaling factor can be outputted to the scaling factor estimation unit 2.

Since information about a partial image thus outputted is outputted for each allocation area, by arranging information about partial images in association with central pixels, patterns of information about partial images are obtained. The patterns of information about partial images are passed to the next scaling factor estimation unit 2.

The reference image data memory units 15a to 15d store reference image data, respectively. The respective reference image data is data indicating the characteristic of partial images corresponding the range of specific scaling factors. For example, the reference image data is the pattern of a partial image scaled in accordance with a respective scaling factor, and scaling factors are provided correspondingly to the patterns of the partial images. By thus holding, as reference image data, the patterns of partial images scaled in accordance with scaling factors, even if an input image has been scaled, partial images in the input image can be detected without fail.

FIG. 6 is a diagram for explaining reference image data. FIGS. 6A to 6D show 11- by 11-dot reference image data containing circular patterns having diameters of 7, 8, 9, and 10 dots, respectively. Circles shown in FIGS. 6A to 6D are reference circles for the respective diameters and hatched areas are circular patterns for the respective diameters. Reference image data of scaling factors 80 to 85% is two-dimensional image data containing a circular pattern having a diameter of 7 dots, as shown in FIG. 6A. Similarly, reference image data of scaling factors 85 to 100% is two-dimensional image data containing a circular pattern having a diameter of 8 dots, as shown in FIG. 6B. Reference image data of scaling factors 100 to 110% is two-dimensional image data containing a circular pattern having a diameter of 9 dots, as shown in FIG. 6C. Reference image data of scaling factors 110 to 120% is two-dimensional image data containing a circular pattern having a diameter of 10 dots, as shown in FIG. 6D.

Figure 6A:
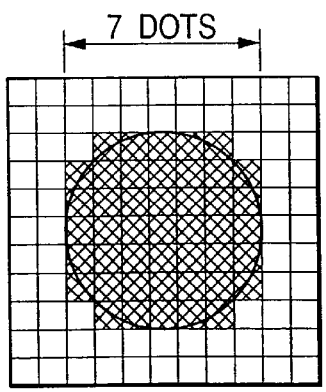
FIG. 6 is a diagram for explaining reference image data.
Figure 6B:
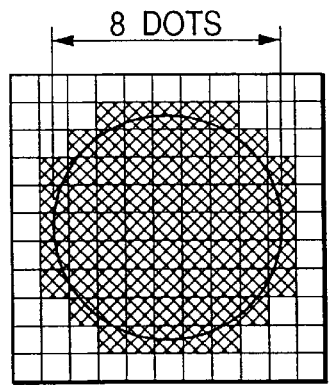
Figure 6C:
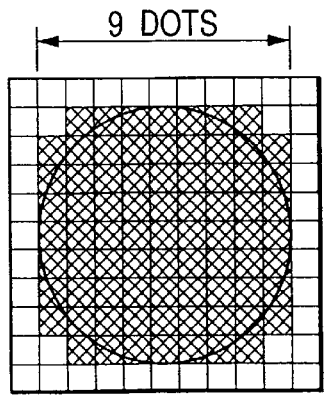
Figure 6B:
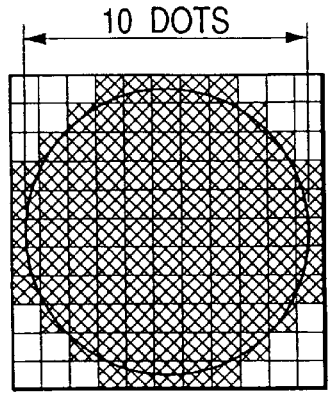

Herein, in the reference image data memory unit 15a in FIG. 3, which corresponds to scaling factors 80 to 85%, e.g., reference image data shown in FIG. 6A can be stored. Similarly, in the reference image data memory unit 15b, which corresponds to scaling factors 85 to 100%, e.g., reference image data shown in FIG. 6B can be stored. In the reference image data memory unit 15c, which corresponds to scaling factors 100 to 110%, e.g., reference image data shown in FIG. 6C can be stored. In the reference image data memory unit 15d, which corresponds to scaling factors 110 to 120%, e.g., reference image data shown in FIG. 6D can be stored.

Figure 7:
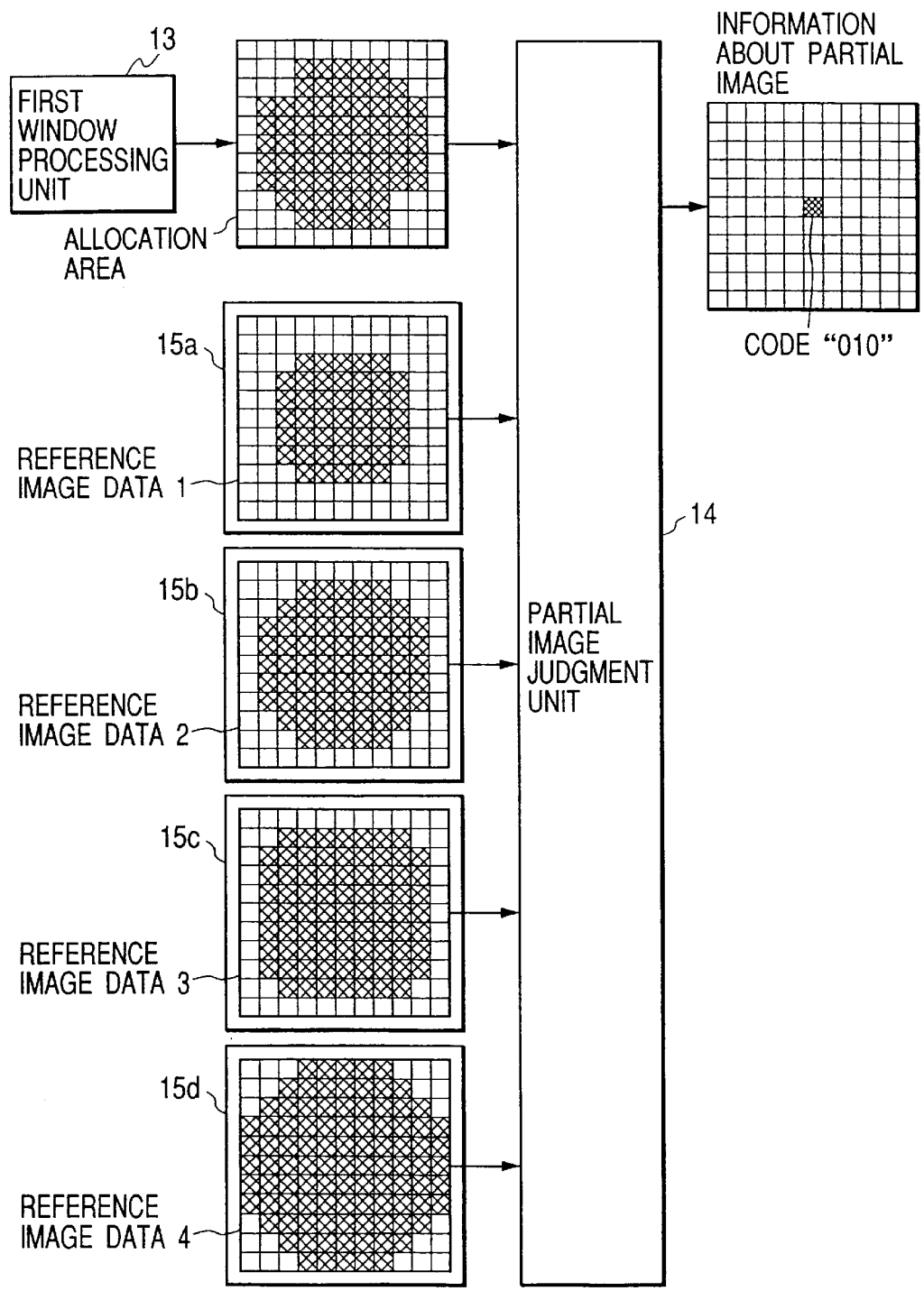
FIG. 7 is a diagram for explaining a judgement operation of a partial image judgment unit in the first embodiment of an image processing apparatus of the present invention.

FIG. 7 is a diagram for explaining a judgement operation of the partial image judgment unit in the first embodiment of an image processing apparatus of the present invention. From the reference image data memory units 15a to 15d are respectively inputted the reference image data shown in FIGS. 6A to 6D. There are also shown examples of images of allocation areas allocated in the first window processing unit 13. The partial image judgment unit 14 compares images of the allocation areas with reference image data. Now, if a match is obtained in 110 dots of 121 dots (=11×11 dots), suppose an image of an allocation area and reference image data match. That is, a threshold value is defined as 110. In the specific example shown in FIG. 7, the numbers of matches between reference image data stored in the reference image data memory units 15a to 15d and the image of the allocation area are 99, 119, 111, and 91, respectively. The reference image data stored in the reference image data memory units 15b and 15c have the number of matches greater than or equal to the threshold value, 110. However, the image of the allocation area has a greater number of matches with the reference image data stored in the reference image data memory unit 15b than with the reference image data stored in the reference image data memory unit 15c. Accordingly, it is judged that the image of the allocation area shown in FIG. 7 matches the reference image data stored in the reference image data memory unit 15b. In association with the central position of the allocation area, '010' is outputted as information about the partial image.

Figure 8:
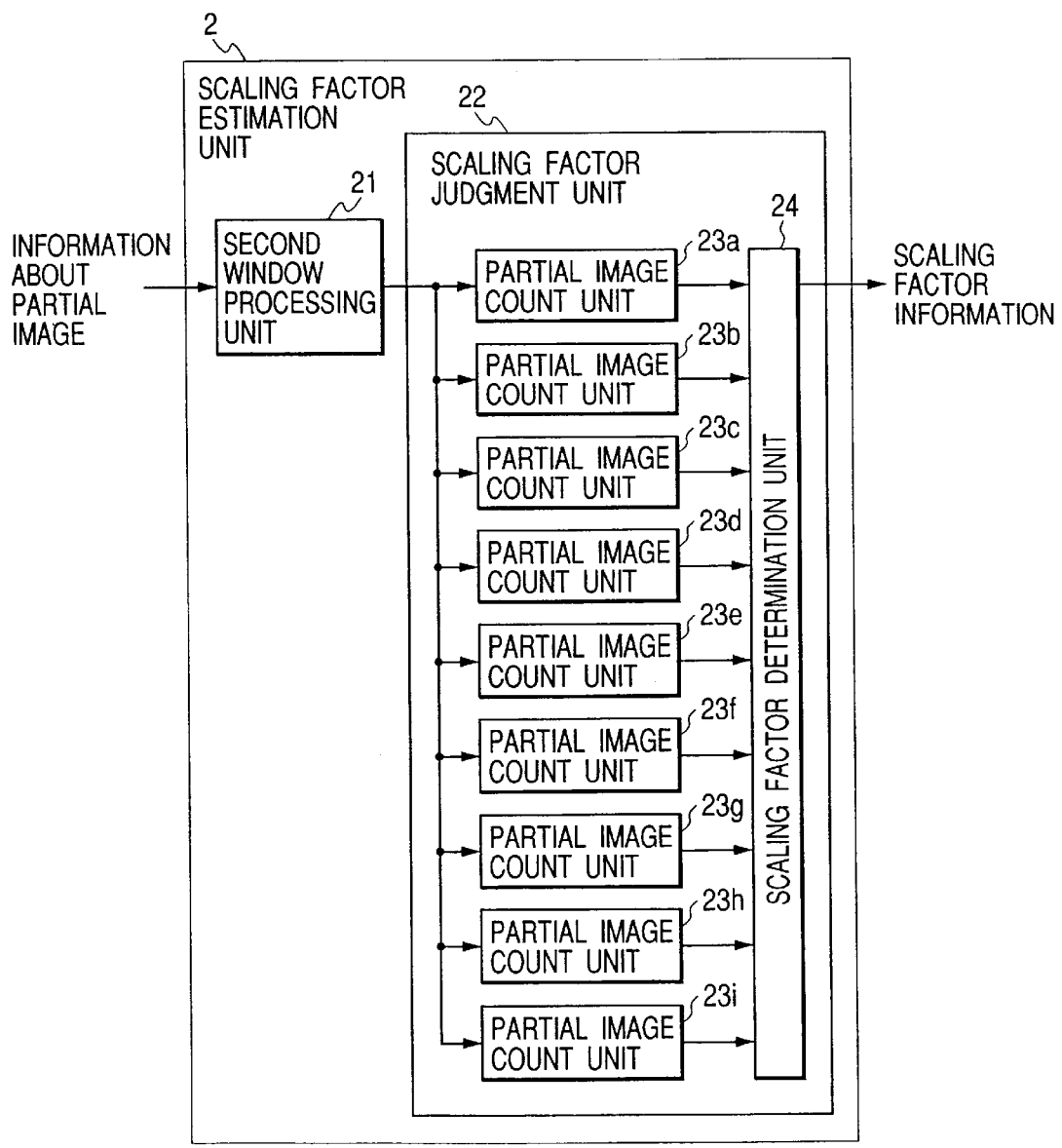
FIG. 8 is a block diagram showing a scaling factor estimation unit in the first embodiment of an image processing apparatus of the present invention.

FIG. 8 is a block diagram showing a scaling factor estimation unit in the first embodiment of an image processing apparatus of the present invention. In FIG. 21, the reference numeral 21 designates a second window processing unit; 22, a scaling factor judgment unit; 23a to 23i, partial image count units; and 24, a scaling factor determination unit.

Figures 9, 10:
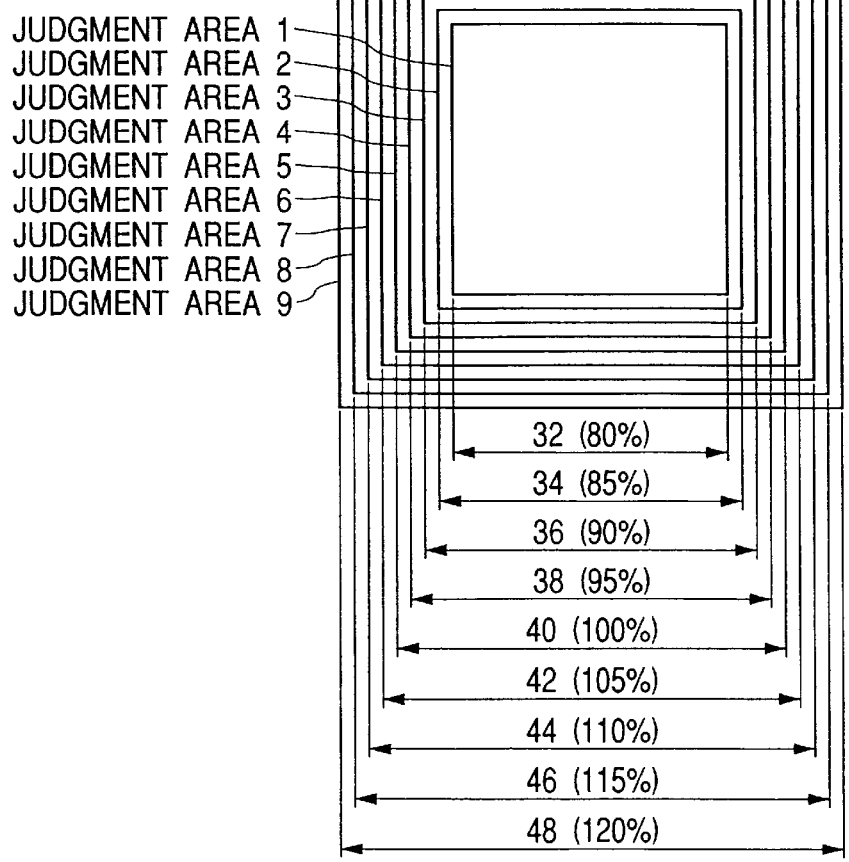
FIG. 9 is a diagram for explaining a relationship between scaling factors of a specific image and its sizes.
FIG. 10 is a diagram for explaining judgment areas in the first embodiment of an image processing apparatus of the present invention.

The second window processing unit 21 successively fetches a partial characteristic of a proper size from patterns of information about partial images outputted from the partial image detection unit 1. FIG. 9 is a diagram for explaining a relationship between scaling factors of a specific image and its sizes. As shown in FIG. 2, a specific image having a maximum diameter Lmax of 5 mm is converted from 600 dpi to 200 dpi in resolution by resolution conversion unit in the resolution conversion unit 12 of the partial image detection unit 1 shown in FIG. 3, resulting in an image of about 40 dots. Since information about partial images is outputted in association with each pixel of an input image, patterns of information about partial images can also be considered as with the input image having been subjected to resolution conversion. That is, without scaling, to detect the specific image would require that a pattern of information about partial images has a size of 40 by 40 dots. If scaling is performed, the maximum diameter of the specific image will be as shown in FIG. 9. Based on this information, the size of a partial characteristic fetched in the second window processing unit 21 could be determined. In this example, since the maximum diameter of the specific image is 48 dots for a scaling factor of 120% as shown in FIG. 9, the size of the partial characteristic can be set to 48×48 dots. The size of a partial characteristic and an area shape, which can be freely defined, may be set as required to suit a specific image or a processing method.

The scaling factor judgment unit 22, from information about partial images contained in the partial characteristics fetched in the second window processing unit 21, determines a final scaling factor of the input image. The scaling factor judgment unit 22 has a plurality of partial image count units 23a to 23i and the scaling factor determination unit 24.

The partial image count units 23a to 23i allocate their respective different judgment areas in accordance with the range of scaling factors in the partial characteristic fetched in the second window processing unit 21. For each of the allocated judgment areas, the number of pieces of information indicating the range of scaling factors, received as information about partial images, that indicates the range of scaling factors corresponding to the judgment area concerned is counted. FIG. 10 is a diagram for explaining judgment areas in the first embodiment of an image processing apparatus of the present invention. Since the size of the specific image differs in accordance with scaling factors as shown in FIG. 9, areas in which specific images corresponding to the respective scaling factors exist are allocated as judgment areas. In this example, a judgment area 1 shown in FIG. 10 is an area having a scaling factor of 80% the size of which is 32×32 dots. Similarly, a judgment area 2 is an area having a scaling factor of 85% the size of which is 34×34 dots. A judgment area 3 is an area having a scaling factor of 90% the size of which is 36×36 dots. A judgment area 4 is an area having a scaling factor of 95% the size of which is 38×38 dots. A judgment area 5 is an area having a scaling factor of 100% the size of which is 40×40 dots. A judgment area 6 is an area having a scaling factor of 105% the size of which is 42×42 dots. A judgment area 7 is an area having a scaling factor of 110% the size of which is 44×44 dots. A judgment area 8 is an area having a scaling factor of 115% the size of which is 46×46 dots. A judgment area 9 is an area having a scaling factor of 120% the size of which is 48×48 dots. In this example, counting in the judgment area 1 is performed in the partial image count unit 23a. Similarly, counting in the judgment areas 2 to 9 is performed in the partial image count units 23b to 23i, respectively. Judgment areas are not limited to rectangles, which are used in this example; any shape including a circle is allowed. The step of the judgment areas may be arbitrarily set, more finely or roughly to meet scaling factors.

The scaling factor determination unit 24 compares values counted in the partial image count units 23a to 23i with the proper number of partial images in the specific image. If there is only one partial image count unit giving a matching value, a scaling factor associated with the partial image count unit outputting the matching value is judged as valid scaling information. If there are two or more partial image count units outputting a matching value, of the partial image count units outputting the matching value, a scaling factor associated with the partial image count unit which allocates the smallest judgment area is judged as valid scaling information. The scaling information judged as valid is outputted.

Figure 11:
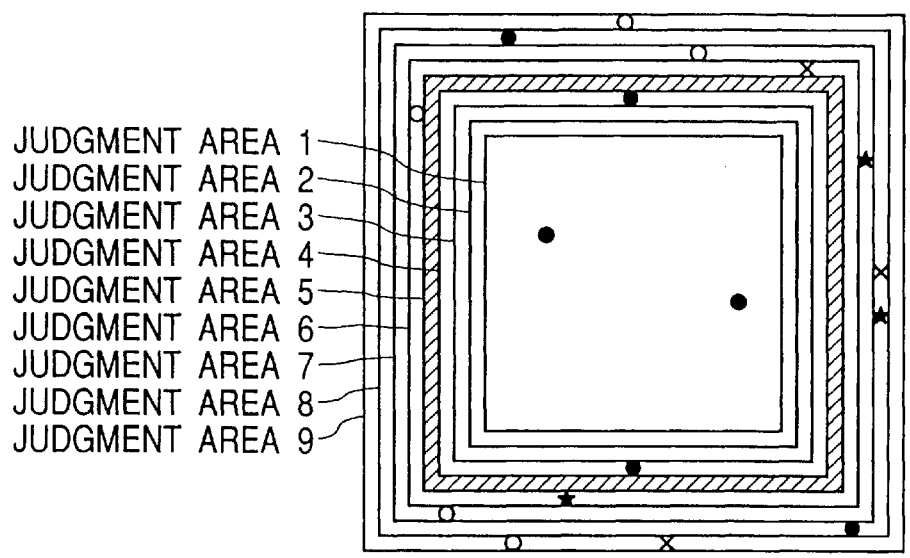
FIG. 11 is a diagram for explaining a specific example of scaling factor judgment processing in a scaling factor determination unit in the first embodiment of an image processing apparatus of the present invention.

FIG. 11 is a diagram for explaining a specific example of scaling factor judgment processing in the scaling factor determination unit in the first embodiment of an image processing apparatus of the present invention. In the figure, a star (★) designates the position where code '001' is outputted as information about partial images. Similarly, a black circle (●), a white circle (○), and a cross (x) designate the positions where codes '010', '011', and '100' are respectively outputted as information about partial images. The judgment areas are as described in FIG. 10.

Since the judgment areas 1 and 2 are areas corresponding to scaling factors 80% and 85%, respectively, the partial image count units 23a and 23b count information about partial images indicating scaling factors 80 to 85% within the judgment areas 1 and 2, that is, the number of codes '001' (star: ★) respectively. Similarly, the partial image count units 23c to 23e count the number of codes '010' (black circle: ●) within the judgment areas 3 to 5, respectively. The partial image count units 23f and 23g count the number of codes '011' (white circle: ○) within the judgment areas 6 and 7, respectively. The partial image count units 23h and 23i count the number of codes '100' (x) within the judgment areas 8 and 9, respectively. Accordingly, the counted values of the partial image count units 23a to 23i are 0, 0, 2, 4, 4, 1, 3, 2, and 3, respectively.

Next, the scaling factor determination unit 24 compares the number of partial images (four in the example shown in FIG. 2) in the specific image with each of the counted values outputted from the partial image count units 23a to 23i. In this example, the counted values of the partial image count units 23d and 23e are 4, which is equal to the number of partial images. In this case, as described above, of the partial image count units outputting the matching value, a scaling factor corresponding to the partial image count unit in which the smallest judgment area is allocated is judged as valid scaling information. That is, of the partial image count units 23d and 23e, the partial image count unit 23d has a smaller judgment area. Accordingly, the scaling factor 95% associated with the partial image count unit 23d is outputted as valid scaling information. In this way, in this example, it is found that the input image is an image scaled with a scaling factor of 95%.

Herein, a description will be made of the reason that, when there are two or more partial image count units outputting a matching value, a scaling factor associated with a partial image count unit which allocates the smallest judgment area concerned is judged as valid scaling information.

In the two cases described below, there are two or more partial image count units outputting a matching value. In the first case, as in the above example, in the partial image count units counting information about the same partial image, two or more partial image count units output a value equal to the number of partial images of a specific pattern. In the example shown in FIG. 11, the partial image count units 23d and 23e corresponding to the judgment areas 4 and 5 that count code '010' (black circle: ●) output the same value. Accordingly, it is found that a specific area exists in the judgment area 4 or 5. However, as shown in FIG. 11, code '010' (black circle: ●) does not exist in an area (the hatched area in FIG. 11) between the judgment areas 4 and 5 and four of code '010' (black circle: ●) exist only inside the judgment area 4. Accordingly, the scaling factor determination unit 24 judges that the specific image is contained within the judgement area 4, and a scaling factor 95% indicated by the partial image count unit 23d corresponding to the judgment area 4 is outputted from the scaling factor determination unit 24 as valid scaling information.

Figure 12:
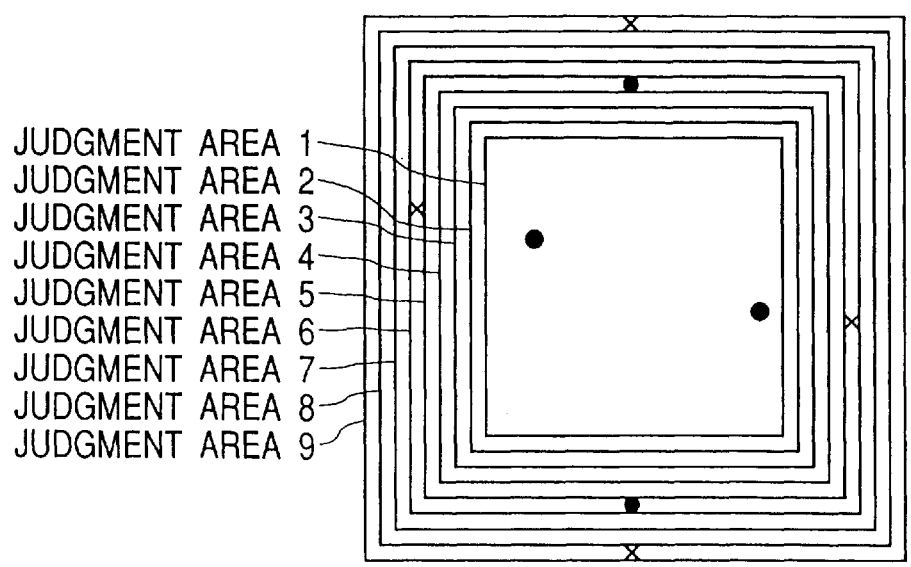
FIG. 12 is a diagram for explaining another example of output of a proper number of counted values from a plurality of partial image count units in the first embodiment of an image processing apparatus of the present invention.

In the second case, in the partial image count units counting information about different partial images, there are two or more partial image count units outputting a value equal to the number of partial images of specific patterns. FIG. 12 is a diagram for explaining another example of output of a proper number of counted values from a plurality of partial image count units in the first embodiment of an image processing apparatus of the present invention. In FIG. 12, there are four of code '100' (cross: x) within the judgment area 9 and there are four of '010' (black circle: ●) within the judgment area 5, so that the counted values of the areas is equal to the number of partial images in the specific image. However, it is assumed that the specific image shown in FIG. 2 is composed of partial images that are identical in shape and size within the area, and other images like the partial images do not exist therein. Accordingly, if an image composed of code '100' (cross: x) in FIG. 12 is the specific image, partial images having different sizes must not exist within the judgment area 9. In the example shown in FIG. 12, since code '010' (black circle: ●) exists in the judgment area 9, it is judged that an image composed of code '100' (cross: x) is not the specific image. On the other hand, no more than four of code '010' (black circle: ●) exists in the judgment area 5. Accordingly, the scaling factor determination unit 24 judges that an image composed of four of code '010' (black circle: ●) within the judgment area 5 is valid. It outputs a scaling factor 100% indicated by the partial image count unit 23e corresponding to the judgment area 5 as valid scaling information.

In this way, the scaling factor determination unit 24 compares the number of partial images in the specific image with counted values outputted from the partial image count units 23a to 23i. When there are two or more partial image count units outputting a matching value, the scaling factor determination unit 24 judges a scaling factor associated with the partial image count unit counting the smallest judgment area concerned as valid scaling information and outputs the scaling information. By this process, even if there are a plurality of candidates for a final scaling factor of the output results of the partial image count units, the scaling factor can be correctly determined. In this way, the scaling factor of an input image can be determined from a specific image composed of a plurality of partial images.

Figure 13:
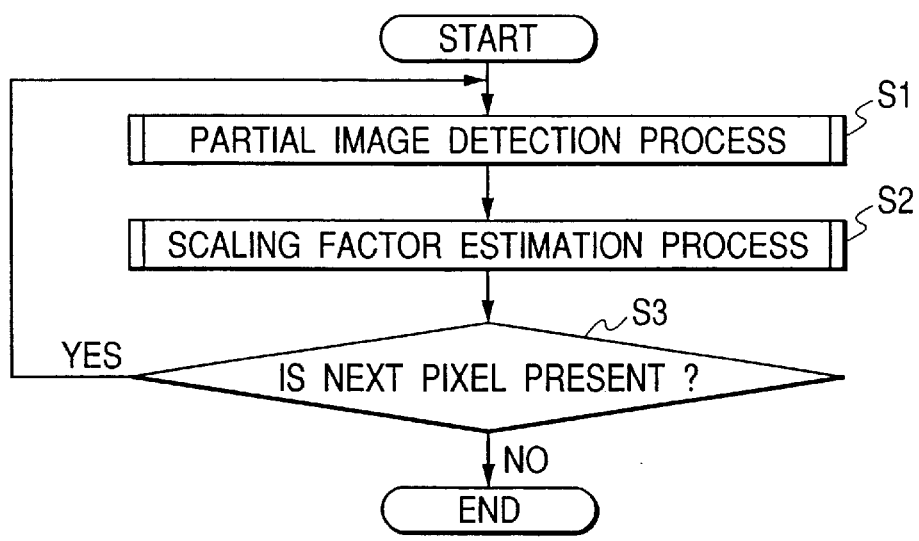
FIG. 13 is a flowchart showing the operation of an image processing apparatus of the present invention in the first embodiment.

FIG. 13 is a flowchart showing the operation of an image processing apparatus of the present invention in a first embodiment. FIGS. 13 to 16 shown below also show a first embodiment of an image processing method of the present invention. When an input image is inputted, a scaling factor determination operation is started. In the partial image detection process S1, the partial image detection unit 1 detects information about partial images. Next, in the scaling factor estimation process S2, the scaling factor estimation unit 2 determines a scaling factor from the information about partial images detected in the partial image detection process. It is determined in S3 whether the next pixel exists or not, and if the next pixel is present, control returns to the partial image detection process S1; otherwise, this process terminates.

Figure 14:
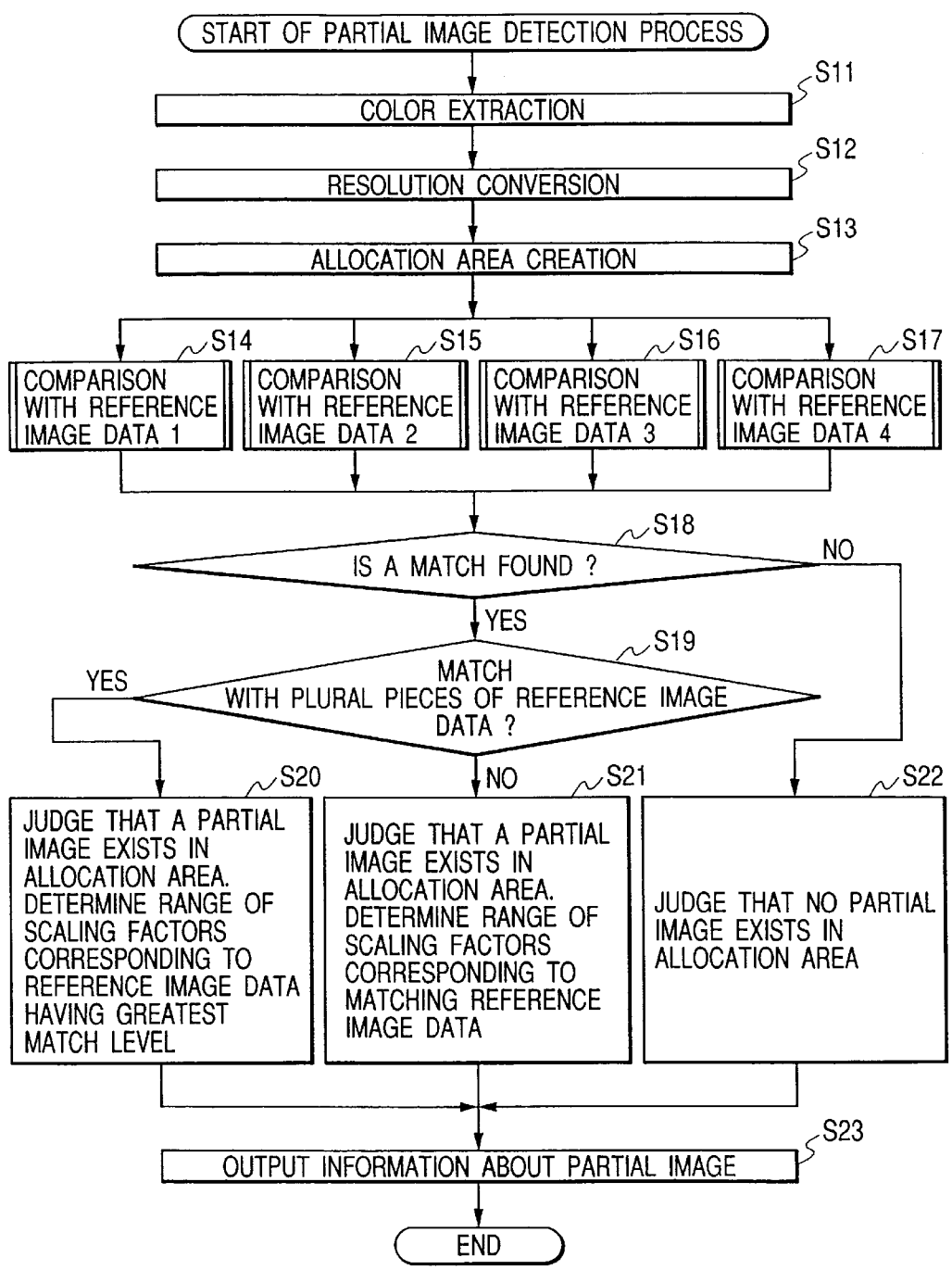
FIG. 14 is a flowchart showing an example of a partial image detection process in the first embodiment of the present invention.

FIG. 14 is a flowchart showing an example of a partial image detection process in the first embodiment of the present invention. When partial image detection processing is started, in S11, the color extraction unit 11 extracts only preset colors. In S12, the resolution conversion unit 12 performs resolution conversion for the color data extracted in the color extraction unit 11. For example, resolution is converted from 600 dpi to 200 dpi. In S13, the first window processing unit 13 allocates an allocation area the size of which allows partial images to be detected from the image data converted in resolution, and in S14 to S17, the partial image judgment unit 14 performs comparison with reference image data stored in the reference image data memory units 15a to 15d. The comparison with the reference image data performed in S14 to S17 is performed by processing shown in FIG. 15.

Figure 15:
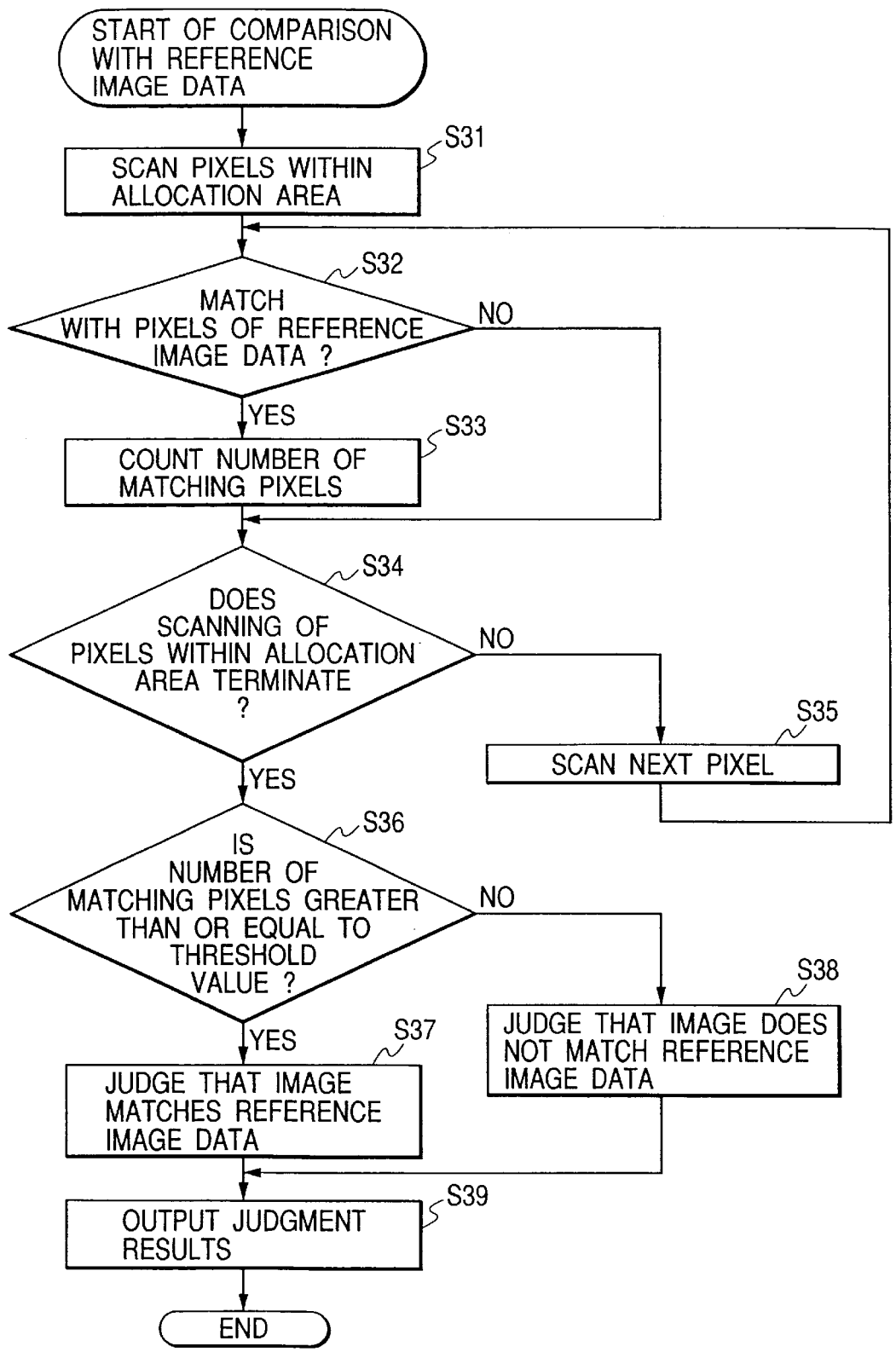
FIG. 15 is a flowchart showing an example of processing for comparison with reference image data in the first embodiment of the present invention.

FIG. 15 is a flowchart showing an example of processing for comparison with reference image data in the first embodiment of the present invention. When comparison between the allocation area and the reference image data is started, pixels within the allocation area are scanned in S31. This example assumes that the allocation area has 11×11 dots as shown in FIG. 5. It is judged in S32 whether or not image information of a target pixel being scanned matches image information of a pixel of reference image data at the same position as the target pixel. If they match, the number of matching pixels is counted in S33. It is judged in S34 whether or not all pixels within the allocation area have been scanned, and if not so, in S35, with the next pixel set to a target pixel, control is returned to S32 to repeat the comparison loop in S32 to S34.

If pixels of the entire allocation area have been scanned, it is judged in S36 whether or not the number of pixels matching image information of reference image data is greater than or equal to the respective predetermined threshold values. If less than the threshold value, it is judged in S38 that the images do not match, and if greater than or equal to the threshold value, it is judged in S37 that they match. Finally, in S39, a judgment result is outputted and the process terminates (S40).

Referring back to FIG. 14, upon termination of comparison with the reference image data, it is judged in S18 whether or not there is a match as the result of comparison with the reference image data. If there is no match, it is judged in S22 that no partial image exists in the allocation area. If there is a match, it is judged in S19 whether or not there is a match with a plurality of pieces of reference image data. If it is judged in S19 that there is no match with a plurality of pieces of reference image data, that is, if there is a match with only one piece of reference image data, it is judged in S21 that a partial image exists in the allocation area, and information indicating the range of scaling factors corresponding to it is outputted as information about partial images. If it is judged in S19 that there is a match with a plurality of pieces of reference image data, it is judged in S20 that the image of the allocation area matches reference image data having the greatest match level. That is, it is judged that the image of the allocation area matches reference image data exhibiting the greatest value counted in the comparison with the reference image data in S14 to S17. In S23, judgment results in S20, S21, and S22 are outputted and the process terminates. Information indicating the range of scaling factors outputted as information about partial images can be outputted in codes as described above.

Figure 16:
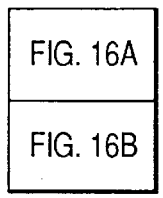
FIG. 16 is a flowchart showing an example of a scaling factor estimation process in the first embodiment of the present invention.
Figure 16A:
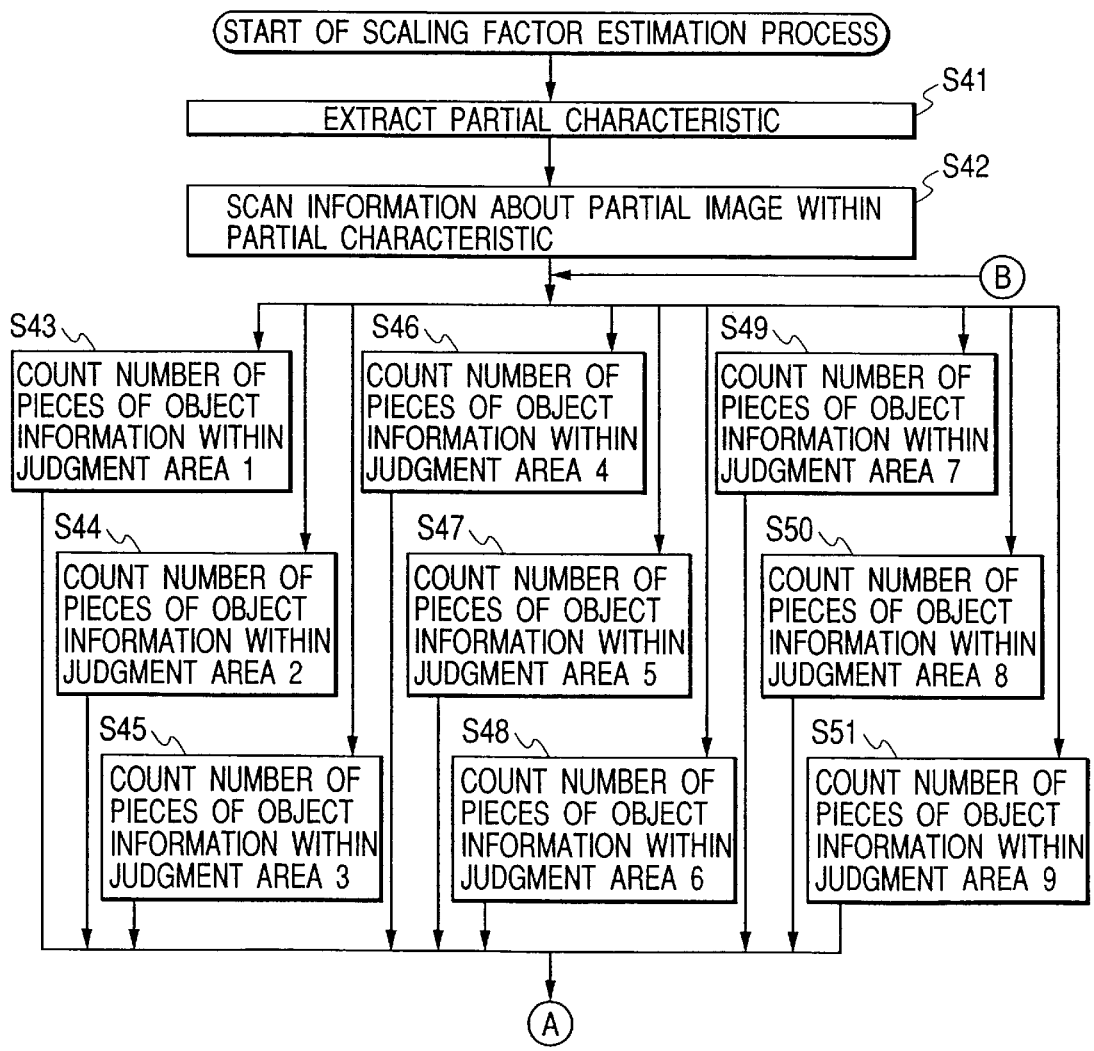
Figure 16B:
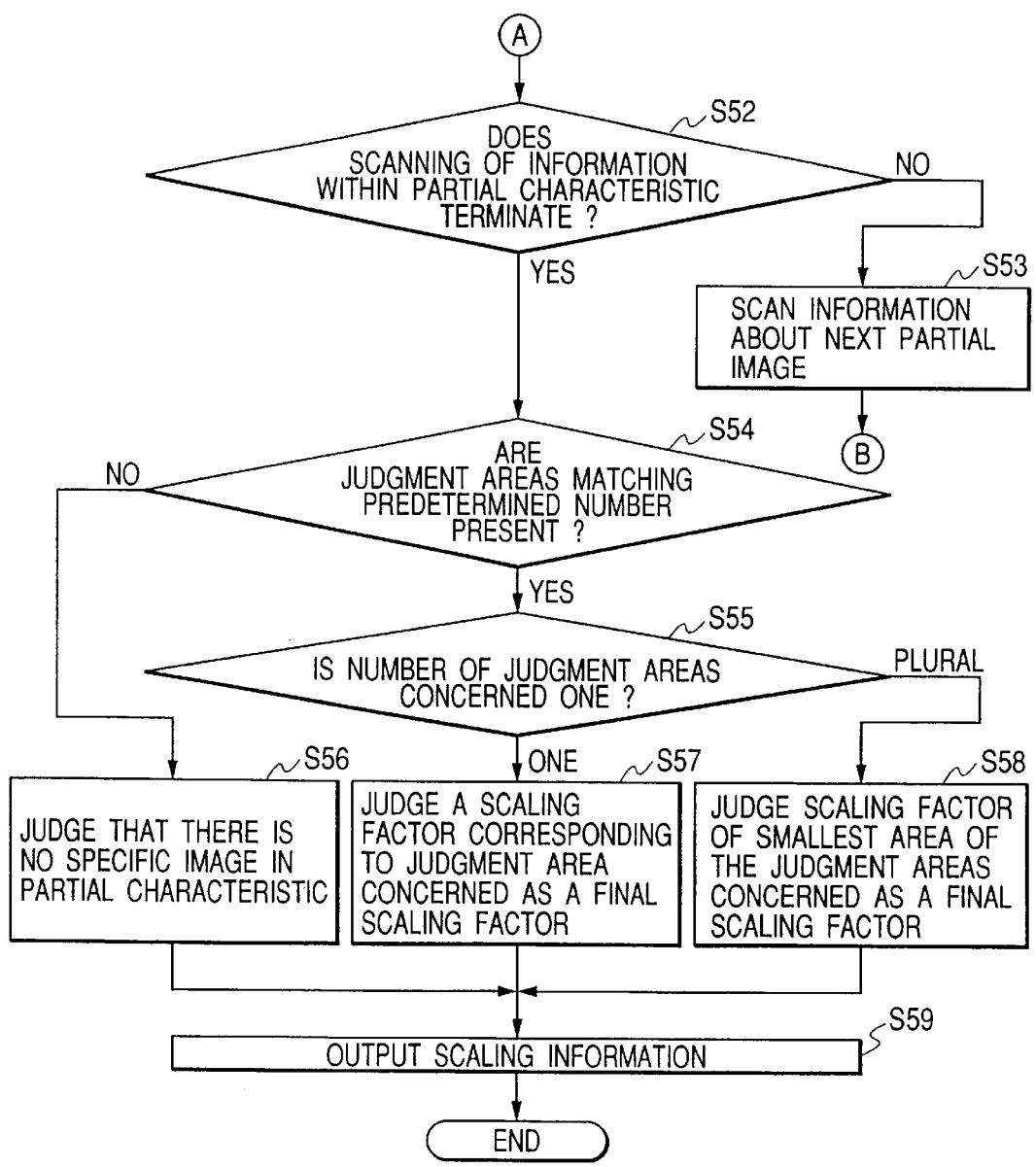

FIG. 16 is a flowchart showing an example of a scaling factor estimation process in the first embodiment of the present invention. When the scaling factor estimation operation is started based on the result of the partial image detection process, in S41, the second window processing unit 21 allocates a partial characteristic the size (e.g., 48×48) of which allows the specific image to be detected. In S42, information about partial images within the partial characteristic is scanned, and in S43 to S51, the partial image count units 23a to 23i respectively count the number of pieces of information about partial images corresponding to the judgment areas 1 to 9 corresponding to the scaling factors. The judgment areas can be allocated, for example, as shown in FIG. 10. The partial image count units 23a to 23i count only information about partial images indicating scaling factors corresponding to the respective judgment areas. That is, in S43 and S44, for the judgment areas 1 and 2, only information about a partial image judged to match the reference image data 1, stored in the reference image data memory unit 15a in the partial image detection process, is counted. Similarly, in S45 to S47, for the judgment areas 3 to 5, only information about a partial image judged to match the reference image data 2 stored in the reference image data memory unit 15b in the partial image detection process is counted. In S48 to S49, for the judgment areas 6 and 7, only information about a partial image judged to match the reference image data 3 stored in the reference image data memory unit 15c in the partial image detection process is counted. In S50 to S51, for the judgment areas 8 and 9, only information about a partial image judged to match the reference image data 4 stored in the reference image data memory unit 15d in the partial image detection process is counted.

It is judged in S52 whether or not all information about partial images within the partial characteristic has been scanned, and if not so, information about the next partial image is scanned in S53.

On termination of scanning of information about partial images within the partial characteristic, it is judged in S54 whether or not there is a judgment area exhibiting the same value as the number of partial images in the specific image. If it is judged in S54 that there is no judgment area exhibiting the same value as the number of partial images in the specific image, it is judged in S56 that the specific image does not exist in the partial characteristic. In S54, if there is a judgment area exhibiting the same value as the number of partial images in the specific image, it is judged in S55 whether the number of judgment areas is one or not. If it is judged in S55 that there is one judgment area exhibiting the same value as the number of partial images in the specific image, it is judged in S57 that a scaling factor corresponding to the judgment area is final scaling information. If it is judged in S55 that a plurality of judgment areas exhibit the same value as the number of partial images in the specific image, it is judged in S58 that a scaling factor corresponding to the smallest judgment area of them is final scaling information. The scaling information judged as final scaling information is outputted in S59 and then the process terminates.

In this way, according to the first embodiment of the present invention, the scaling factor of an image containing a specific image composed of a plurality of partial images can be correctly determined.

Next, a second embodiment of an image processing apparatus of the present invention will be described. The configuration of the image processing apparatus of the second embodiment is the same as that of the first embodiment; for example, it comprises the partial image detection unit 1 and the scaling factor estimation unit 2 as shown in FIG. 1.

The partial image detection unit 1, as shown in FIG. 3, is the same as that in the first embodiment in that it comprises the color extraction unit 11, the resolution conversion unit 12, the first window processing unit 13, the partial image judgment unit 14, and the reference image data memory units 15a to 15d. As in the first embodiment, the partial image detection unit may be configured without providing the color extraction unit 11 and/or the resolution conversion unit 12.

Of these components of the partial image detection unit 1, the color extraction unit 11, the resolution conversion unit 12, the first window processing unit 13, and the reference image data memory units 15a to 15d are the same as those of the first embodiment in operation and function, and therefore the explanations are omitted here. A description will be made of the partial image judgment unit 14.

The partial image judgment unit 14, in the example shown in the first embodiment described above, outputted information (code) indicating the range of scaling factors as information about partial images. However, in the second embodiment, it outputs only information indicating whether or not a partial image exists in an allocation area, as information about partial images. That is, the partial image judgment unit 14 performs pattern matching between an image of an allocation area allocated in the first window processing unit 13 and each of the reference image data stored in the reference image data memory units 15a to 15d. If the number of matching pixels is greater than a threshold value set in advance for each of the reference image data, it is judged that the image of the allocation area matches the reference image data; if smaller than the threshold value, it is judged that they do not match. If it is judged that the image of the allocation area matches one piece of the reference image data, it is judged that a partial image exists in the allocation area allocated in the first window processing unit 13, information, e.g., '1' indicating that a partial image exists is outputted to a central position (x5, y5) as information about a partial image. In other cases, '0' is outputted as information about a partial image.

Figure 17:
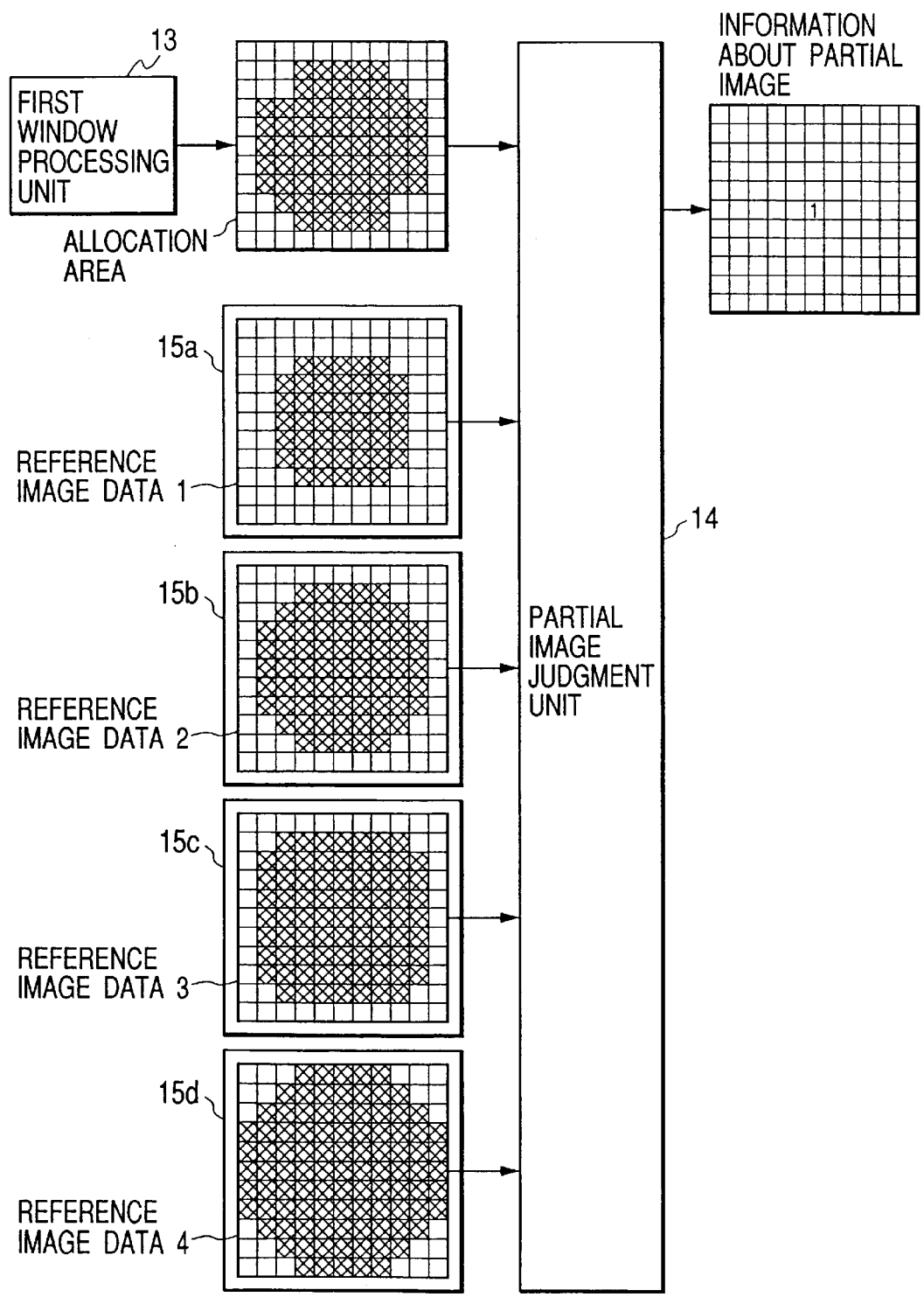
FIG. 17 is a diagram for explaining a judgment operation of a partial image judgment unit in a second embodiment of an image processing apparatus of the present invention.

FIG. 17 is a diagram for explaining a judgment operation of the partial image judgment unit in the second embodiment of an image processing apparatus of the present invention. Reference image data stored in the reference image data memory units 15a to 15d is that shown in FIGS. 6A to 6D, respectively, and a threshold value is 110 for all reference image data.

In the partial image judgment unit 14, the image of the allocation area allocated in the first window processing unit 13 is subjected to pattern matching with each of the reference image data stored in the reference image data memory units 15a to 15d. In this example, the number of matching dots is 99, 119, 111, and 91, respectively. The results of matching with the reference image data stored in the reference image data memory units 15b and 15c are greater than or equal to the threshold value, 110. Accordingly, it is judged that a partial image exists in the allocation area allocated in the first window processing unit 13. '1' is outputted to the central position as information about a partial image.

Figure 18:
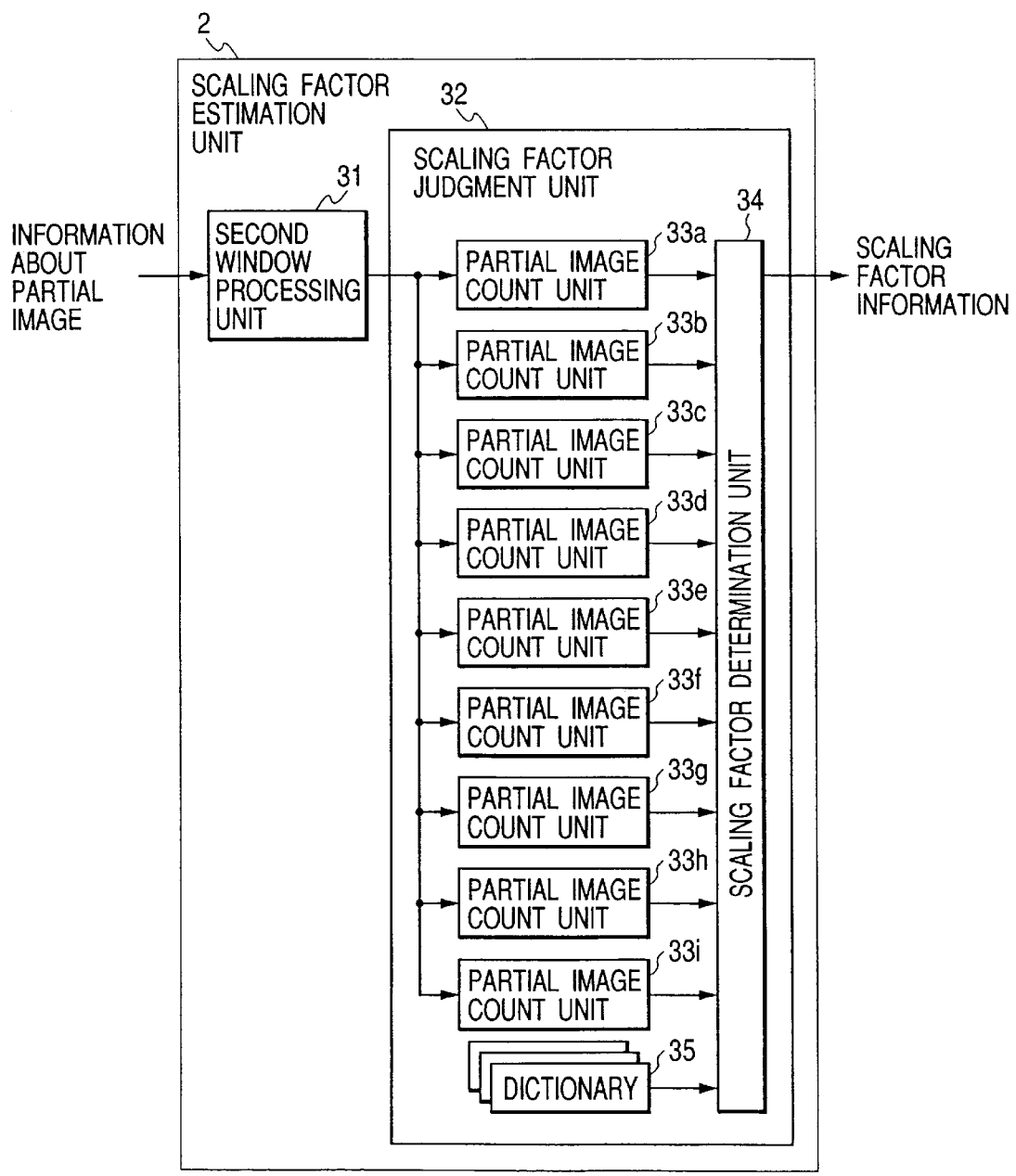
FIG. 18 is a block diagram showing a scaling factor estimation unit in the second embodiment of an image processing apparatus of the present invention.

FIG. 18 is a block diagram showing a scaling factor estimation unit in the second embodiment of an image processing apparatus of the present invention. In FIG. 18, the reference numeral 31 designates a second window processing unit; 32, a scaling factor judgment unit; 33a to 33i, partial image count units; 34, a scaling factor determination unit; and 35, a dictionary. The second window processing unit 31 is the same as the second window processing unit 21 in the first embodiment described above, except for information about partial images received. The scaling factor judgment unit 32, which is functionally the same as the scaling factor judgment unit 22 in the first embodiment described above, comprises the partial image count units 33a to 33i, the scaling factor determination unit 34, and the dictionary 35 in the second embodiment.

Figure 19:
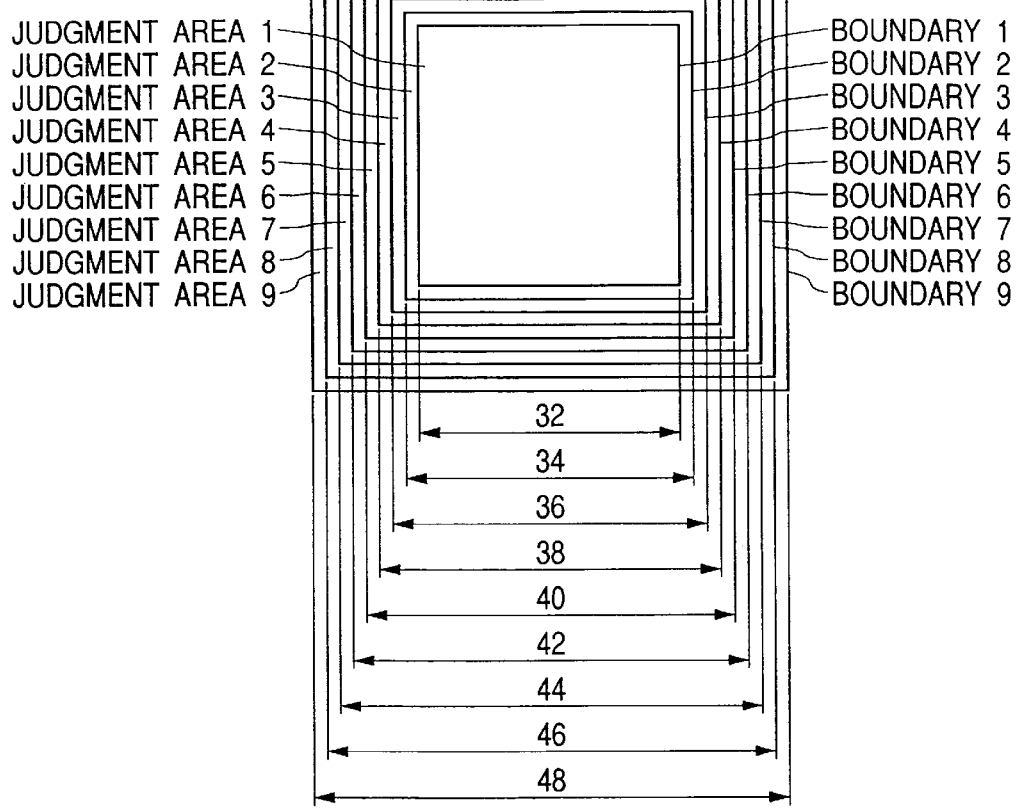
FIG. 19 is a diagram for explaining judgment areas in the second embodiment of an image processing apparatus of the present invention.

The partial image count units 33a to 33i counts the number of pieces of information about partial images indicating the existence of the partial images within judgment areas. FIG. 19 is a diagram for explaining judgment areas in the second embodiment of an image processing apparatus of the present invention. A judgment area 1 is an internal area of a boundary 1, and a judgment area 2 is a ring-shaped area surrounded by boundaries 1 and 2. Like the judgment area 2, a judgment area 3 is a ring-shaped area surrounded by boundaries 2 and 3. A judgment area 4 is a ring-shaped area surrounded by boundaries 3 and 4. A judgment area 5 is a ring-shaped area surrounded by boundaries 4 and 5. A judgment area 6 is a ring-shaped area surrounded by boundaries 5 and 6. A judgment area 6 is a ring-shaped area surrounded by boundaries 5 and 6. A judgment area 7 is a ring-shaped area surrounded by boundaries 6 and 7. A judgment area 8 is a ring-shaped area surrounded by boundaries 7 and 8. A judgment area 9 is a ring-shaped area surrounded by boundaries 8 and 9. The partial image count units 33a to 33i, which correspond to the judgment areas 1 to 9, respectively, counts the number of pieces of information about partial images indicating the existence of the partial images within the respective judgment areas.

Judgment areas are not limited to rectangles, which are used in this example; any shape including a circle is allowed. The step of boundaries for separating the judgment areas may be arbitrarily set, more finely or roughly.

Figure 20:
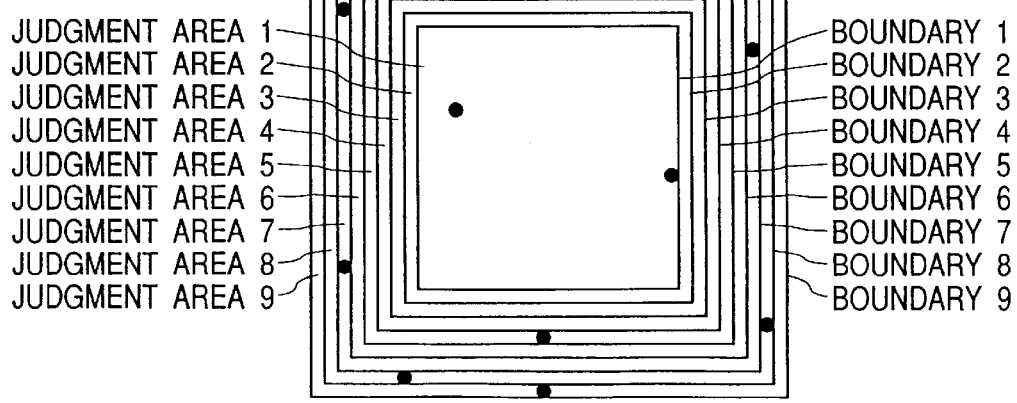
FIG. 20 is a diagram for explaining a specific example of counting information about partial images in partial image count units in the second embodiment of an image processing apparatus of the present invention.

FIG. 20 is a diagram for explaining a specific example of counting information about partial images in the partial image count units in the second embodiment of an image processing apparatus of the present invention. In FIG. 20, a black circle (●) designates information about partial images indicating the existence of the partial images. Now, suppose that a partial characteristic shown by the drawing of FIG. 20 is obtained from the second window processing unit 31. In this case, as described in FIG. 19, the judgment areas 1 to 9 are allocated, and information about partial images indicating the existence of the partial images within the respective judgment areas is counted. The respective counted values of the partial image count units 33a to 33i are 2, 0, 0, 0, 2, 0, 3, 3, and 2.

Referring back to FIG. 18, the dictionary 35 stores the number of pieces of information about partial images in the respective judgment areas for scaling factors. FIG. 21 is a diagram for explaining an example of the contents of the dictionary in the second embodiment of an image processing apparatus of the present invention. If a specific image is an image shown in FIG. 2A, the contents as shown in FIG. 21 should be stored. The values of the judgment areas 1 to 9 correspond to the counted values of the partial image count units 33a to 33i. '-' in FIG. 21 designates that any value may be set; the value is not used for judgment.

The scaling factor determination unit 34 compares counted values outputted from the partial image count units 33a to 33i with the contents of the dictionary 35, and finds a scaling factor matching the values of the judgment areas. The scaling factor determination unit 34 regards the found scaling factor as final scaling information and outputs it.

For example, presuppose that a partial characteristic fetched in the second window processing unit 31 is a pattern shown in FIG. 20 and the contents of the dictionary 35 are as shown in FIG. 21. The respective counted values of the partial image count units 33a to 33i are 2, 0, 0, 0, 2, 0, 3, 3, and 2, as described above. These values indicate that the judgement area 1 is 2, the judgement areas 2 to 4 are 0, and the judgment area 5 is 2, and comparison of these values with the contents of the dictionary 35 shows that these values match the counted values of the judgment areas for a scaling factor of 100%. Consequently, the scaling factor 100% is outputted as final scaling information. In this way, the scaling factor of a specific image composed of a plurality of partial images can be estimated.

Next, a description will be made of an example of the operation of an image processing apparatus of the present invention in the second embodiment, and a second embodiment of an image processing method of the present invention. The operation of the image processing apparatus in the second embodiment is basically the same as that in the above-described first embodiment, as shown in FIG. 13, except for the processing contents of the partial image detection process of S1 and the scaling factor estimation process of S2.

Figure 22:
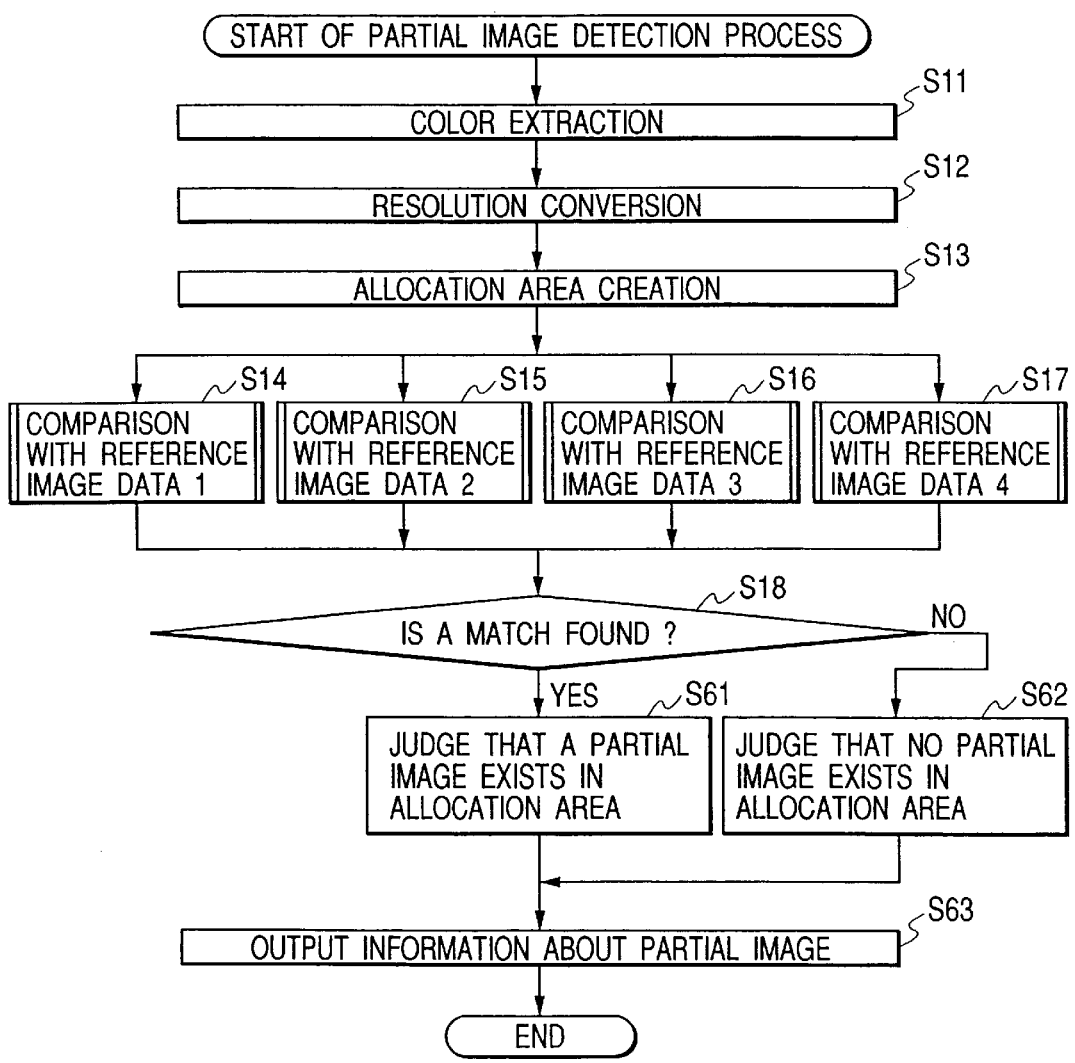
FIG. 22 is a flowchart showing an example of a partial image detection process in the second embodiment of the present invention.

FIG. 22 is a flowchart showing an example of the partial image detection process in the second embodiment of the present invention. In FIG. 22, steps having the same processing contents as in FIG. 14 are assigned the same reference numerals and are not described. In S11 to S17, it is judged whether or not an image of an allocation area matches the reference image data. It is judged in S18 whether there is a match in the judgments or not. If it is judged that there is a match, it is judged in S61 that a partial image exists in the allocation area. In other cases, it is judged in S62 that no partial image exists in the allocation area. Finally, in S63, the result of the judgments is outputted as information about partial images, and the process terminates. As information about partial images outputted, if it is judged in S18 that a partial image exists in the allocation area, information indicating the existence of the partial image, e.g., '1' can be outputted, and if it is judged that no partial image exists in the allocation area, information indicating the nonexistence of a partial image, e.g., '0' can be outputted.

Figure 23:
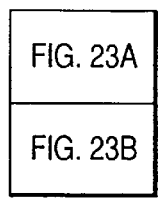
FIG. 23 is a flowchart showing an example of a scaling factor estimation process in the second embodiment of the present invention.
Figure 23A:
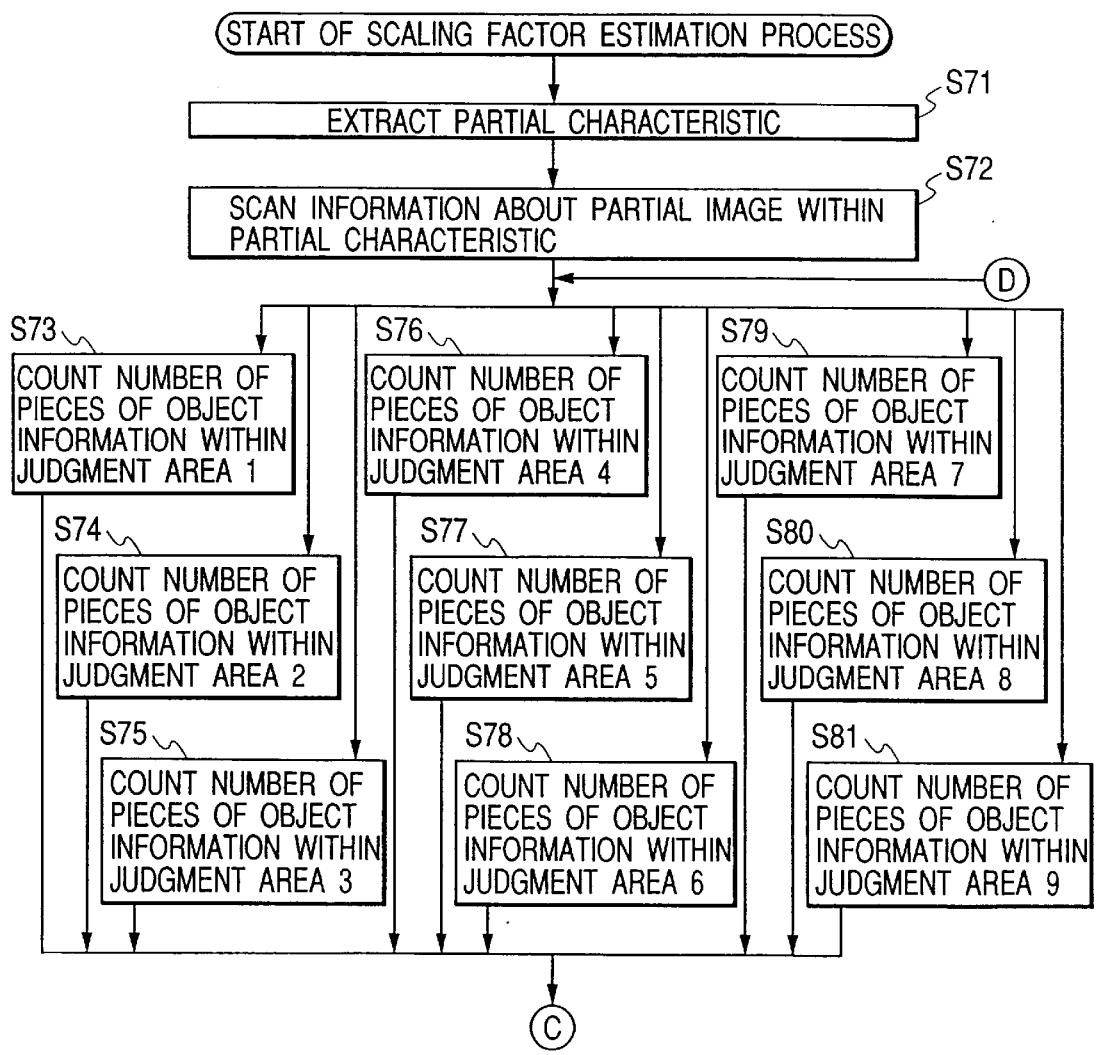

FIG. 23 is a flowchart showing an example of a scaling factor estimation process in the second embodiment of the present invention. When scaling factor estimation processing is started based on the result of the partial image detection process, in S71, a partial characteristic the size (e.g., 48×48) of which allows the specific image to be detected is extracted. In S72, information about partial images within the partial characteristic is scanned. In S73 to S81, the number of pieces of information about partial images, indicating the existence of the partial images, which exists within the judgment areas 1 to 9 surrounded by given boundaries is respectively counted. That is, in S73, counting is performed using an internal area of the boundary 1 shown in FIG. 19 as a judgment area 1. In S74, counting is performed for the ring-shaped judgment area 2 surrounded by the boundaries 1 and 2. Similarly, in S75 to S81, counting is performed for the ring-shaped judgment areas 3 to 9 shown in FIG. 19.

It is judged in S82 whether or not all information about partial images within the partial characteristic has been scanned, and if not so, information about the next partial area is scanned in S83. If information about partial areas within the partial characteristic has been scanned, in S84, the dictionary 35 is referred to, and the counted values of the judgment areas are compared with the values of the judgment areas stored in the dictionary. It is judged in S85 whether there is a match or not. If the result of the judgment in S85 shows that there is no match with the contents of the dictionary 35, it is judged in S86 that the specific image does not exist in the partial characteristic. If the result of the judgment in S85 shows that there is a match with the contents of the dictionary 35, it is judged in S87 that the matching scaling factor in the dictionary 35 is judged as a final scaling factor. In S88, the judgment result is outputted and the process terminates. In this way, the scaling factor of inputted images can be determined from a specific image.

In this way, according to the second embodiment of the present invention, the scaling factor of an image containing a specific image composed of a plurality of partial images can be correctly determined. According to the second embodiment, in the partial image detection unit 1 and the partial image detection process, regardless of whether an input image is scaled or not, the partial images in the input image can be detected.

Figure 24:
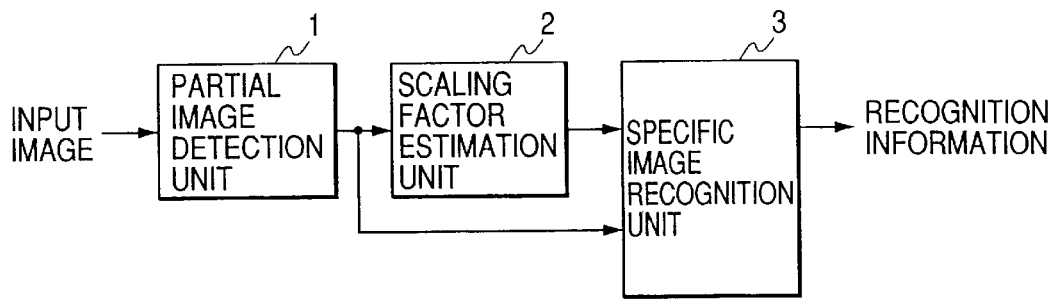
FIG. 24 is a block diagram showing a third embodiment of an image processing apparatus of the present invention.

FIG. 24 is a block diagram showing a third embodiment of an image processing apparatus of the present invention. In FIG. 24, the same portions as in FIG. 1 are assigned the same reference numerals and are not described. The reference numeral 3 designates a specific image recognition unit. This embodiment gives an example that the specific image recognition unit 3 is provided after a scaling factor estimation unit 2.

The specific image recognition unit 3 receives information about partial images from the partial image detection unit 1 and receives scaling information from the scaling factor estimation unit 2. Taking the scaling information into account, matching processing is performed between a specific image and the information about partial images. In this case, the specific image should have been converted into information similar to the information about partial images. Or, an image may be restored based on the information about partial images so that matching with the specific image is performed with the same resolution. Furthermore, although not shown, an input image or an input image having been subjected to resolution conversion may be obtained to perform matching with the specific image. In matching processing, identification processing can be used by a method generally called recognition processing such as, e.g., template matching. Whether an input image contains a specific image or not can be determined by identification processing by the specific image recognition unit 3.

Figure 25:
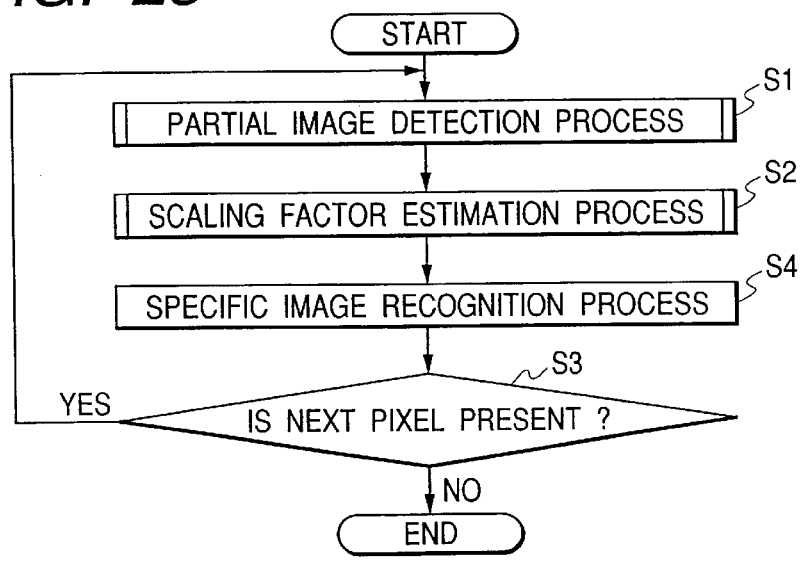
FIG. 25 is a flowchart showing an example of the operation of an image processing apparatus of the present invention in the third embodiment.

FIG. 25 is a flowchart showing an example of the operation of an image processing apparatus of the present invention in the third embodiment. FIG. 25 also shows a third embodiment of an image processing method of the present invention. In the third embodiment, the specific image recognition process in S4 is provided after the scaling factor estimation process of S2 in the first embodiment shown in FIG. 13. In the specific image recognition process, based on information about partial images outputted in the partial image detection process in S1 and scaling information outputted in the scaling factor estimation process in S2, whether an input image contains a specific image or not is judged by processing generally called recognition processing such as template matching.

The partial image detection process of S1 and the scaling factor estimation process of S2 in the third embodiment may be the operation of either of the above-described first embodiment or second embodiment.

In the first and third embodiments described above, the explanations were made with respect to two-dimensional scaling. However, without being limited to this, the present invention is also applicable to one-dimensional scaling.

Figure 26:
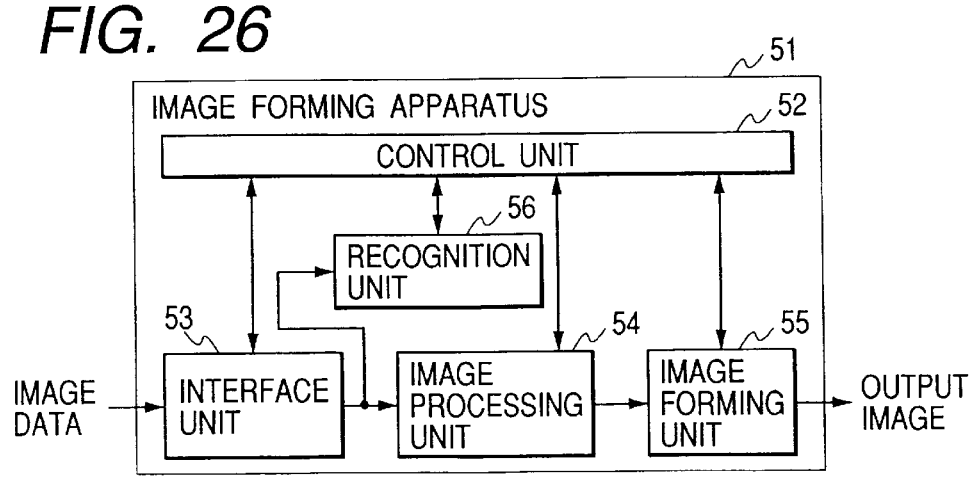
FIG. 26 is a block diagram showing an embodiment of an image forming apparatus of the present invention.

FIG. 26 is a block diagram showing an embodiment of an image forming apparatus of the present invention. In FIG. 26, the reference numeral 51 designates an image forming apparatus; 52, a control unit; 53, an interface unit; 54, an image processing unit; 55, an image forming unit; and 56, a recognition unit. The image forming apparatus 51 includes the control unit 52, the interface unit 53, the image processing unit 54, the image forming unit 55, and the recognition unit 56.

The control unit 52 controls the units to form an image on a recording media, based on inputted image data. Particularly, when it is judged by the recognition unit 56 that a specific image is contained in image data received in the interface unit 53, the image data is nullified.

The interface unit 53 receives image data sent from an external apparatus such as a personal computer. In the received image data, a specific image indicating that an image must not be formed may be contained. The image data may be a scaled version of an original image. A specific image is composed of a plurality of partial images, as described above, and may be an image as shown in FIG. 2.

The image processing unit 54 performs different types of processing to form an image. For example, as in the case where an image is inputted after different types of processing is performed in an external apparatus, the image processing unit 54 may not be provided if image processing is not required in the image forming apparatus.

The image forming unit 55 forms an image on a recording media. Any method is allowed to form an image. On receiving from the control unit 52 a command for nullifying processing, the image forming unit 55 forms an image according to the command.

The recognition unit 56 can take the configuration described in the third embodiment of an image processing apparatus of the present invention. That is, the recognition unit 56 judges whether or not a specific image composed of a plurality of partial images as described above exists in inputted image data, and outputs the judgment result to the control unit 52. At this time, if the inputted image data is a scaled image, the specific image can be recognized as described above.

To describe the operation briefly, image data is received by the interface 53 from an external apparatus such as a personal computer, proper image processing is performed in the image processing unit 54, and then an image is formed on a recording medium in the image forming unit 55. At this time, the interface unit 53, the image processing unit 54, and the image forming unit 55 are controlled by the control unit 52.

The image data received in the interface unit 53 is also inputted to the recognition unit 56. The recognition unit 56 judges whether or not a designated specific image exists in the inputted image data, and outputs the judgement result to the control unit 52. If it is judged in the recognition unit 56 that the designated specific image exists, the control unit 52 nullifies the inputted image data. As nullifying processing, for example, image data may be created which is required to paint the entire output image in a predetermined color, to let the image forming unit 55 form a created image. Alternatively, the control unit 52 may inhibit the image forming unit 55 from forming the received image data so as not to form an image. In this way, control can be performed so that, for image data containing a specific image, an image is not formed immediately. At this time, even if the image data has been scaled, by applying an image processing apparatus of the present invention to the recognition unit 56, a scaled specific image can be correctly recognized to perform nullifying processing.

As apparent from the above description, according to the present invention, the scaling factor of a specific image composed of a plurality of partial images can be correctly determined. Furthermore, it becomes possible to recognize a scales specific image based on the scaling information determined. Furthermore, the present invention has the effect that it can provide an image forming apparatus which can perform nullifying processing by recognizing a scaled specific image even if scaled image data is inputted.

What is claimed is:

1. An image processing apparatus that processes an input image containing a specific image composed of a predetermined number of partial images wherein the input image may have been scaled, comprising:

a partial image detection part that extracts the characteristics of said partial images contained in said input image to output information about said partial images, wherein said partial image detection part comprises:

reference image data memory parts that store a plurality of pieces of reference image data representative of the characteristics of said partial images, a first window processing part that successively allocates an area of a proper range from said input image as an allocation area, and a partial image judgment part that compares an image of said allocation area allocated by the first window processing part with said reference image data stored in said reference image data memory parts, if there is a match with one of said plurality of pieces of reference image data, judging that said partial images exist in said allocation area, and outputting the judgment result as information about said partial images for each of said allocation areas; and a scaling factor estimation part that finds an area where a given number of said partial images exist, based on information about said partial images, outputted from said partial image detection part, to determine a scaling factor of said input image.

2. The image processing apparatus according to claim 1 wherein said partial image judgment part further performs the following if there is a match with one of said plurality of pieces of reference image data:

outputting information indicating the range of scaling factors corresponding to said matching reference image data as information about said partial images for each of said allocation areas.

3. The image processing apparatus according to claim 1 wherein said partial image detection part further comprises: a color extraction part that extracts given colors corresponding to said partial images from said input image from said input image and a resolution conversion part that performs resolution conversion for images of given colors, extracted by said color extraction part, before passing the images to said first window processing part.

4. The image processing apparatus according to claim 1 wherein the respective pieces of said reference image data correspond to the range of specific scaling factors and are representative of the characteristics of said partial images.

5. The image processing apparatus according to claim 2 wherein said scaling factor estimation part comprises: a second window processing part that successively fetches a partial characteristic from information about said partial images per required portion, the information about said partial images being extracted by said partial image detection part; and a scaling factor judgment part that determines the scaling factor of said input image from information about said partial images, contained in said partial characteristic fetched by said second window processing part, wherein said scaling factor judgment part comprises: a plurality of partial image count parts that allocate different judgement areas in accordance with the range of scaling factors within said partial characteristic and, for each of the judgment areas, counting the number of pieces of information indicating the range of said scaling factors within the judgment area concerned, outputted from said partial image judgment part, that indicates the range of said scaling factors corresponding to the judgment area concerned; and a scaling factor determination part that determines the scaling factor of said input image from the number of pieces of information indicating the range of said scaling factors within said judgment areas corresponding to the scaling factors, counted by said partial image count parts.

6. The image processing apparatus according to claim 5, wherein said scaling factor determination part compares a predetermined number of partial images in said specific image with counted values outputted from said partial image count part; if one of said partial image count parts exhibits a matching value, judging a scaling factor corresponding to the partial image count part outputting the matching value as valid scaling information; if two or more of said partial image count parts output a matching value, judging a scaling factor associated with the partial image count part allocating the smallest of said judgement areas of said partial image count parts concerned as valid scaling information; and outputting said valid scaling information.

7. The image processing apparatus according to claim 1, wherein said scaling factor estimation part comprises: a second window processing part that successively fetches a partial characteristic from information about said partial images per required portion, the information about said partial images being extracted by said partial image detection part; and a scaling factor judgment part that determines the scaling factor of said input image from information about said partial images, contained in said partial characteristics fetched by the second window processing part, wherein said scaling factor judgment part comprises: a plurality of partial image count parts that allocates a plurality of non-overlapping judgment areas surrounded by one or two boundaries within said partial characteristic, and for each of the judgment areas, counting the number of judgment results indicating the existence of said partial images within said judgment area, outputted from said partial image judgment part; a dictionary storing the predetermined number of partial images within said specific image for each of judgment areas for scaling factors; and a scaling factor determination part that compares counted values obtained by said partial image count parts with predetermined numbers corresponding to the judgment areas, counted by said partial image count parts and stored in said dictionary, to determine if there is a match, and if a match is found, judging a scaling factor of said dictionary in which the matching value is stored, as valid scaling information.

8. An image processing method for processing an input image containing a specific image composed of a predetermined number of partial images wherein the input image may have been scaled, comprising the steps of:
extracting characteristics of said partial images contained in said input image to obtain information about said partial images, wherein the process of extracting characteristics of said partial images contained in said input image comprises the steps of:
successively allocating an area of a proper range from said input image as an allocation area,
comparing an image of said allocation area allocated with a plurality of pieces of reference image data representative of the characteristics of said partial images stored in advance,
on judging that there is a match with one of said plurality of pieces of reference image data, judging that said partial images exist in said allocation area, and
outputting the judgment result as information about said partial images for each of
said allocation areas; and
finding an area where a given number of said partial images exist, based on information about said partial images to determine the scaling factor of said input image.

9. The image processing method according to claim 8, wherein the process of extracting characteristics of said partial images contained in said input image further comprises:
outputting information indicating the range of scaling factors corresponding to the matching piece of said reference image data as information about said partial images for each of said allocation areas.

10. The image processing method according to claim 8, wherein the process of extracting characteristics of said partial images contained in said input image comprises the steps of: extracting given colors corresponding to said partial images from said input image; and performing resolution conversion for images of the extracted colors before allocating said allocation areas.

11. The image processing method according to claim 8, wherein the respective pieces of said reference image data correspond to the range of specific scaling factors and are representative of the characteristics of said partial images.

12. The image processing method according to claim 9 wherein the process of judging a scaling factor of said input image comprises the steps of: successively fetching a partial characteristic from extracted information about partial images per required portion; allocating different judgement areas in accordance with the range of scaling factors in said fetched partial characteristic; for each of the judgment areas, counting the number of pieces of information indicating the range of said scaling factors within the judgment area concerned that indicates the range of said scaling factors corresponding to the judgment area concerned; and determining the scaling factor of said input image from the counted numbers of pieces of information indicating the range of said scaling factors within said judgment areas corresponding to the counted scaling factors.

13. The image processing method according to claim 12, wherein the process of determining said scaling factor comprises the steps of: comparing the predetermined number of partial images within said specific image with the counted numbers of pieces of information indicating the range of said scaling factors; if there is a match with one of the counted numbers, judging a scaling factor corresponding to the matching counted number as valid scaling information; if there is a match with two or more of the counted numbers, judging a scaling factor corresponding to the smallest of said judgment areas allocated of the counted numbers as valid scaling information; and outputting said valid scaling information.

14. The image processing method according to claim 8, wherein the process of judging the scaling factor of said input image comprises the steps of: successively fetching a partial characteristic from extracted information about said partial images per required portion; allocating a plurality of non overlapping judgment areas surrounded by one or two boundaries within said fetched partial characteristic; for each of the judgment areas, counting the number of judgment results indicating the existence of said partial images; comparing each counted value with the predetermined numbers of partial images within said specific image of judgment areas for scaling factors, stored in advance, to determine whether they match or not; and if there is a match, outputting a scaling factor corresponding to the matching predetermined number as valid scaling information.

15. An image forming apparatus comprising at least: an interface part that receives image data that may have been scaled, from an external apparatus; an image forming part that forms an image based on the image data; a recognition part that judges whether or not a specific image composed of a predetermined number of partial images is contained in said image data; and a control part that controls the overall apparatus, and when it is judged by the recognition part that said specific image is contained in the image data received by said interface part, nullifying the image data, wherein said recognition part comprises: a partial characteristic detection part that extracts the characteristic of said partial image contained in said image data; a scaling factor estimation part that determines the scaling factor of said input image from information of an area where a predetermined number of images exist, the images being extracted as said partial images based on the characteristics of said partial images, extracted by said partial image detection part; and a specific image recognition part that compares the distribution of said partial images with said specific image, taking the scaling factor of said input image determined by the scaling factor estimation part into account, to judge whether said specific image is contained in said input image or not.

16. The image forming apparatus according to claim 15, wherein said control part creates required image data as said nullifying processing and directs said image forming part to form an image based on the image data.

17. The image forming apparatus according to claim 15, wherein said control part performs control to inhibit formation of an image based on image data received as said nullifying processing.

18. The image processing apparatus according to claim 1, wherein a plurality of the partial images have an identical shape and an identical size within a specific area.

19. The image processing method according to claim 8, wherein a plurality of the partial images have an identical shape and an identical size within a specific area.

* * * * *